(12) United States Patent
Barry et al.

(10) Patent No.: US 7,251,256 B1
(45) Date of Patent: Jul. 31, 2007

(54) SYNCHRONIZATION OF ASYNCHRONOUS NETWORKS USING MEDIA ACCESS CONTROL (MAC) LAYER SYNCHRONIZATION SYMBOLS

(75) Inventors: Charles Barry, Campbell, CA (US); Jason Fan, Mountain View, CA (US); Robert Stillman, Los Altos, CA (US); Inwhan Choi, Santa Clara, CA (US); David Watson, Rancho Morieto, CA (US)

(73) Assignee: Luminous Networks, Inc., Cupertino, CA (US)

( * ) Notice: Subject to any disclaimer, the term of this patent is extended or adjusted under 35 U.S.C. 154(b) by 0 days.

(21) Appl. No.: 09/574,745

(22) Filed: May 18, 2000

(51) Int. Cl.
H04J 3/06 (2006.01)
(52) U.S. Cl. .................................... 370/503
(58) Field of Classification Search ............ 370/401, 370/445, 503, 254, 351, 400
See application file for complete search history.

(56) References Cited

U.S. PATENT DOCUMENTS

| | | | | |
|---|---|---|---|---|
| 5,610,660 A | * | 3/1997 | Hamano et al. | 375/240.23 |
| 5,726,607 A | * | 3/1998 | Brede et al. | 331/2 |
| 6,078,595 A | * | 6/2000 | Jones et al. | 370/503 |
| 6,222,892 B1 | * | 4/2001 | Taki et al. | 375/354 |
| 6,259,695 B1 | * | 7/2001 | Ofek | 370/389 |
| 6,262,996 B1 | * | 7/2001 | Kainulainen et al. | 370/503 |
| 6,272,138 B1 | * | 8/2001 | Weon | 370/516 |
| 6,278,718 B1 | * | 8/2001 | Eschholz | 370/503 |
| 6,370,161 B1 | * | 4/2002 | Ehrlich et al. | 370/516 |
| 6,438,175 B1 | * | 8/2002 | Yamashita | 375/293 |
| 6,611,537 B1 | * | 8/2003 | Edens et al. | 370/503 |
| 2002/0163932 A1 | * | 11/2002 | Fischer et al. | 370/465 |
| 2003/0086442 A1 | * | 5/2003 | Reynolds et al. | 370/503 |

OTHER PUBLICATIONS

"*XPIF-300A3 / XPIF-300A3-50 Gigabit Bit Stream Processor,*" *MMC Networks*, Issue 0.91, pp. 3-63.
"*GMAC-B3 Gigabit Media Access Controller,*" *MMC Networks*, Issue 1.0, pp. 3-49.
"*T1/E1/OC3 System Synchronizer,*" *Mitel Semiconductor*, Issue 3, (Sep. 1999) pp. 1-31.
"*Multi-Gigabit Interconnect Chip,*" *Vitesse Semiconductor Corporation*, Advance Product Information, (Jun. 25, 1999), pp. 1-38.

* cited by examiner

*Primary Examiner*—Chi Pham
*Assistant Examiner*—Anh-Vu H Ly
(74) *Attorney, Agent, or Firm*—Sawyer Law Group LLP

(57) ABSTRACT

A method and structure for the distribution and utilization of synchronization within an asynchronous network is described herein. Synchronization is distributed through an asynchronous network via a synchronization symbol periodically inserted on the MAC layer. The priority of this symbol ensures that this symbol is inserted in the MAC layer data stream ahead of all other types of symbols. The insertion of the synchronization symbol in the middle of an ongoing data frame is supported. In addition, a method for synchronization symbol distribution throughout an asynchronous network is presented, along with a method for switching to a new synchronization path (in the event of loss of original synchronization path) based on minimum number of hops from the synchronization source. In addition, a method is described for utilization of the count and interval of received synchronization symbols and the count and interval of transmitted synchronization symbols to generate an error correction signal used in the process of frequency locking of a device's internal hardware to received synchronization symbols from another device. Using the prioritized insertion capability required for synchronization symbols, a variety of other MAC layer control symbols are defined to perform other functions, such as propagation time measurement between adjacent nodes.

13 Claims, 9 Drawing Sheets

REPRESENTATIVE TRANSMISSION OF MAC DATA FRAMES WITH PRIORITIZED INSERTION OF SYNCHRONIZATION SYMBOL

REPRESENTATIVE TRANSMISSION OF MAC DATA FRAMES WITHOUT PRIORITIZED INSERTION OF SYNCHRONIZATION SYMBOL

REPRESENTATIVE TRANSMISSION OF MAC DATA FRAMES WITH PRIORITIZED INSERTION OF SYNCHRONIZATION SYMBOL

REPRESENTATIVE SYNCHRONIZATION DISTRIBUTION PATHS SHOWN WITH DOTTED LINES

US 7,251,256 B1

SYNCHRONIZATION OF ASYNCHRONOUS NETWORKS USING MEDIA ACCESS CONTROL (MAC) LAYER SYNCHRONIZATION SYMBOLS

FIELD OF THE INVENTION

This invention relates to communication networks and, in particular, to a mechanism for synchronization of the devices making up an asynchronous network and to a device used to implement a specialized media access control (MAC) layer protocol.

BACKGROUND

Transport of leased-line services has traditionally occurred over optical networks utilizing the Synchronous Optical Network (SONET) protocol. This is because a fundamental characteristic of a SONET network is synchronous operation, e.g. the availability of a common synchronization or frequency source at SONET network elements. SONET networks rely on the distribution of synchronization from a common clocking source.

The source of common clocking is a highly accurate clock known as a Stratum clock. The different levels of the Stratum hierarchy and the characteristics of each are described in the Telcordia GR-1244-CORE specification, incorporated herein by reference in its entirety. A commonly used external synchronization source is a Stratum 1 global positioning system (GPS) clocking source. For a SONET optical metropolitan access network, the external synchronization source may be attached directly to a device within the network known as the synchronization source device. If there is no external synchronization source directly attached, the synchronization source device may also derive synchronization from any of its external leased line interfaces, as configured by the network operator. Each of the other devices in the network is configured to accept synchronization from one of its high-speed SONET interfaces. An example is shown in FIG. 1 for a metropolitan access bi-directional ring. In FIG. 1A, the paths over which synchronization is distributed originate from a synchronization source device 12 that obtains synchronization from one of its external interfaces. All other devices in the SONET ring derive synchronization from the synchronous frame structure of the incoming data on one of its high-speed SONET interfaces. Devices external to the SONET ring such as device 13 (external to the SONET ring) connected to node 10 and the device 14 (external to the SONET ring) connected to node 12 can derive timing from the nodes within the SONET network.

SONET networks, unfortunately, are not the best solution for the transport of packetized data in metropolitan access networks. Connectionless, asynchronous, packet-switched networks are the most cost-efficient and capacity-efficient solutions for this transport. However, these networks have never required the distribution of synchronization for their operation. It is only now that synchronization distribution within asynchronous networks has become important, as service providers strive to implement a network infrastructure optimized for the transport of packetized data but also capable of the transport of leased-line services. A mechanism to perform this function is critical to reduce the infrastructure cost of metropolitan access networks.

In this specification, the term "synchronization" will be used in phrases such as "synchronization source" interchangeably with the terms "timing" or "clocking".

The mechanism described in this specification utilizes novel functions and capabilities on the media access control (MAC) layer. Some general capabilities required for network synchronization, such as prioritized insertion of control symbols on the MAC layer, enable other novel functions to be performed on the MAC layer that are unrelated to network synchronization.

SUMMARY

A method and structure for the distribution and utilization of synchronization within an asynchronous network is described herein. Synchronization is distributed through an asynchronous network via a synchronization symbol periodically inserted on the MAC layer. The priority of this symbol ensures that this symbol is inserted in the MAC layer data stream ahead of all other types of symbols. The insertion of the synchronization symbol in the middle of an ongoing data frame is supported. In addition, a method for synchronization symbol distribution throughout an asynchronous network is presented, along with a method for switching to a new synchronization path (in the event of loss of original synchronization path) based on minimum number of hops from the synchronization source. In addition, a method is described for utilization of the count and interval of received synchronization symbols and the count and interval of transmitted synchronization symbols to generate an error correction signal used in the process of frequency locking of a device's internal hardware to received synchronization symbols from another device.

Using the prioritized insertion capability required for synchronization symbols, a variety of other MAC layer control symbols are defined to perform other functions, such as propagation time measurement between adjacent nodes.

DETAILED DESCRIPTION OF THE EMBODIMENTS

Figure 1A:
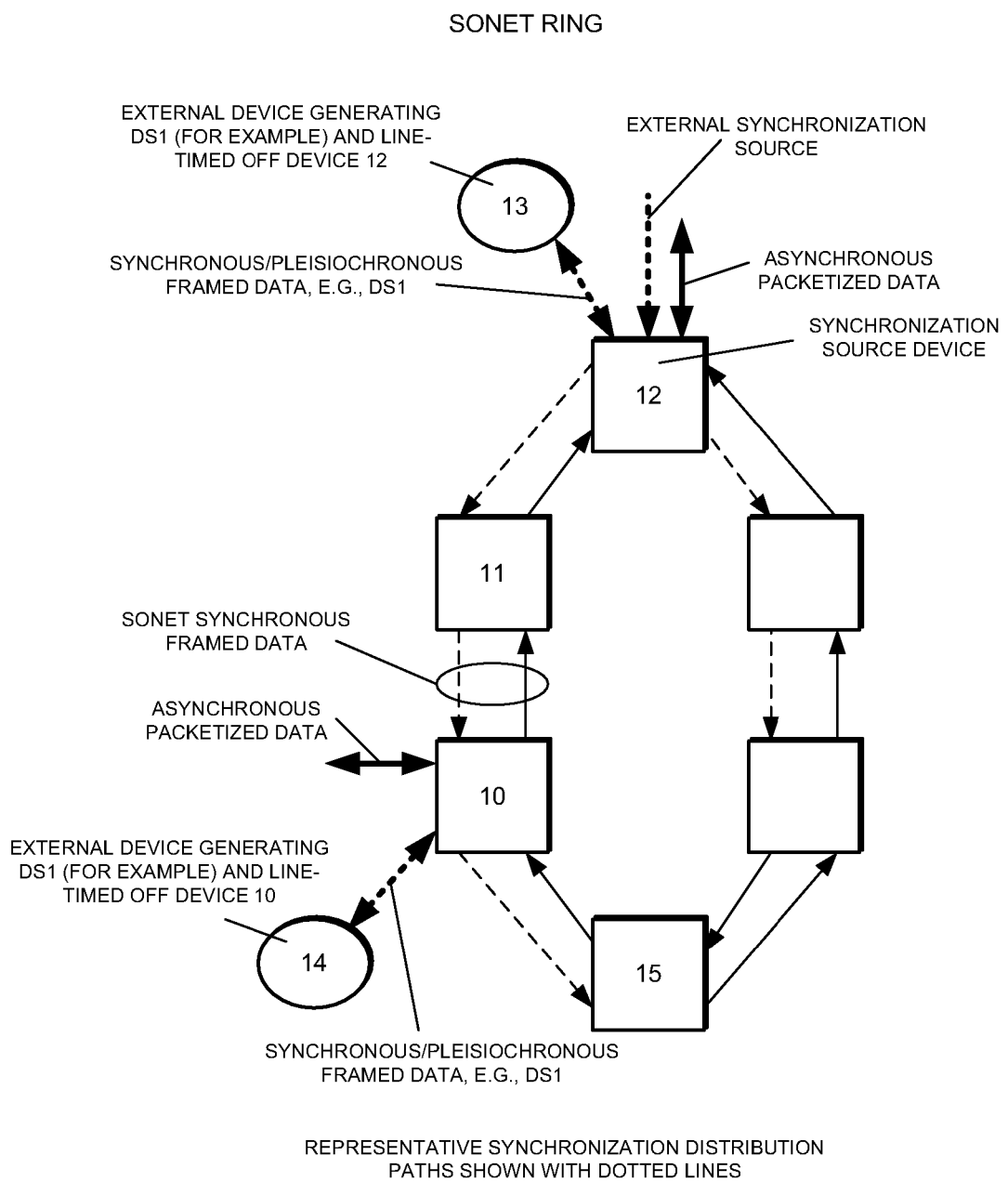
FIG. 1A illustrates a representative SONET ring interconnecting devices belonging to a given virtual network. Two devices external to the virtual network are also shown, connected to the virtual network with lines in boldface. Synchronization paths within the network are shown with dotted lines.

The inventions described herein provide a method and structure for the distribution and utilization of synchronization within an asynchronous network, and for a variety of other MAC layer control functions. Certain aspects of the preferred embodiment are:

a. A synchronization symbol periodically used on the MAC layer between devices on an asynchronous network. (This symbol is invisible to higher network layers.) The priority of this symbol ensures that this symbol is inserted in the MAC layer data stream ahead of all other types of symbols, immediately upon the expiration of the synchronization symbol period.

b. A method for prioritized insertion of a synchronization symbol on the MAC layer, e.g. the capability of inserting a synchronization symbol in the middle of an ongoing data frame.

c. A method for synchronization symbol distribution throughout an asynchronous network (similar to broadcast in a mesh network).

d. A method for switching to a new synchronization path (in the event of loss of original synchronization path) based on minimum number of hops from synchronization source.

e. A method for utilization of the count and interval of received synchronization symbols and the count and interval of transmitted synchronization symbols to generate an error correction signal used in the process of frequency locking of a device's internal hardware to received synchronization symbols from another device.

f. A method for prioritized insertion of "ping" and "pong" symbols to enable accurate measurement of propagation time between adjacent devices in a network.

g. A method for prioritized insertion of "receive buffer full" and "receive buffer available" symbols to enable flow control in a network.

h. A method for prioritized insertion of a "start of control" to enable the insertion of MAC layer control packets in a MAC layer data stream.

These aspects are described in detail below, after a description of the networks to which the inventions described herein are applicable.

Description of the Network

This invention is applicable to devices in a defined virtual network topology. A device is considered to be part of the virtual network if it has at least one full-duplex interface connecting it to other devices in the virtual network, and if the media access control (MAC) protocol used on the links interconnecting the devices is capable of the distribution of synchronization. This MAC protocol is referred to as the Luminous MAC (LMAC) protocol. (This name is used to refer to the MAC protocol in this specification purely for convenience and is not necessarily the permanent name associated with this protocol.) The links on which the LMAC protocol is used are known as LMAC-compatible links. An LMAC-compatible link has the following characteristics: (a) the two devices at the endpoints of the link are not synchronized, e.g. the link is asynchronous; (b) the data transported on the link is in the form of packets, cells, or frames; and (c) the MAC layer encoding of the data is such that devices called LMACs can insert synchronization symbols anywhere into the data stream at the ingress end of the link and remove them at the egress end so that the synchronization symbols are not visible to higher-layer components that process data packets.

Figure 1B:
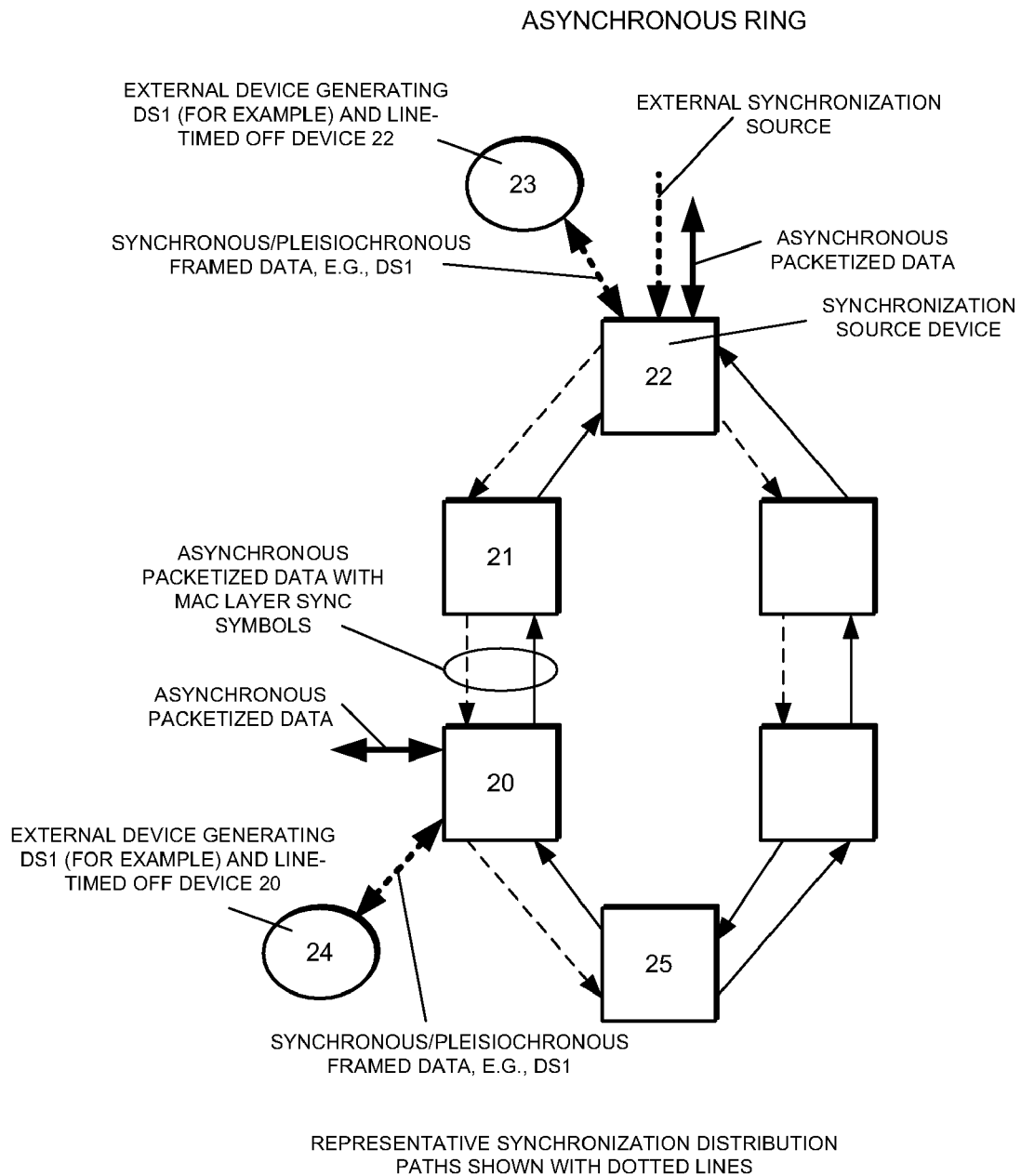
FIG. 1B illustrates a representative asynchronous ring interconnecting devices belonging to a given virtual network. Two devices external to the virtual network are also shown, connected to the virtual network with lines in boldface. Synchronization paths within the network are shown with dotted lines.

The purpose of the virtual network is to deliver data from a variety of different kinds of external interfaces to corresponding compatible external interfaces elsewhere in the network. Each data packet originating at any device is multiplexed onto and transported on LMAC-compatible links until it reaches its destination, at which point it is removed from the virtual network and sent out the corresponding egress external interface. FIG. 1 shows examples of two different virtual network bi-directional ring topologies, one for a SONET ring (FIG. 1A) and the other for an asynchronous LMAC-based ring (FIG. 1B). The thick arrows show representative interfaces to the virtual network from outside the virtual network. These interfaces include synchronous/plesiochronous framed data interfaces such as DS1 and asynchronous connectionless packetized data interfaces such as Fast Ethernet (100BaseT). In addition, there is an external interface to the synchronization source device 22 from an external synchronization source. This interface may be a synchronous framed data interface such as a DS1, or may be a higher-speed synchronous data interface such as an OC-12. The lines interconnecting devices in the virtual network have the synchronous SONET framing format in the SONET ring, and are all LMAC-compatible in the asynchronous ring. The boldface lines indicate external interfaces of the virtual network and connections from devices within the virtual network to devices outside the virtual network. Dotted lines (whether in boldface or not) show representative synchronization distribution paths within the overall network. Dotted lines not in boldface show representative synchronization distribution paths from device 22 to the other devices in the virtual network. The representative external devices 23 and 24 attached to device 22 and to device 20 that generate a DS1 transported from device 20 to device 22 and vice versa are both line-timed off of the virtual network, and hence are connected to the virtual network with dotted lines. Line-timing is described in the book "SONET", incorporated earlier in this specification by reference in its entirety. The use of line-timing in this fashion is one way to provide uniform clocking to devices at the endpoints of a DS1.

It is important to note that the external interfaces to the two ring networks shown in FIG. 1A and FIG. 1B are identical. However, the mechanism used to distribute synchronization in the two networks to support the synchronous framed data interfaces is entirely different.

Other MAC layer functions such as "ping", "pong", "receive buffer full", and "receive buffer available" can be used between any two devices interconnected by a pair of fiber links (so that communication in both directions is possible). This is always the case in bi-directional rings. For these functions to be used in mesh networks, adjacent devices that are connected must be connected in a bi-directional fashion.

The MAC layer function "start of control" does not require a bi-directional connection between adjacent devices to be used.

Description of the Synchronization Symbol and Prioritized Insertion of Synchronization Symbols The synchronization symbol distributed within the asynchronous network shown in FIG. 1B has previously been mentioned as part of the LMAC protocol. In the LMAC protocol, the MAC layer encoding of the data is such that devices called LMACs can insert synchronization symbols anywhere into the data stream at the ingress end of an LMAC-compatible link and remove them at the egress end so that the synchronization symbols are not visible to higher-layer components that process data packets. The synchronization symbol must be a distinct and identifiable series of bits. This series of bits may be broken into subgroupings, such as separate fields within a packet, or it may have a single meaning. The synchronization symbol must be inserted into the data stream on a periodic basis by the LMAC at the ingress end of each LMAC-compatible link. It must have a higher priority than regular priority data, so that it can be inserted into the data stream with timing as precise as possible. The synchronization symbol may be a control symbol in a MAC layer encoding scheme such as 8B/10B encoding (used in Gigabit Ethernet). 8B/10B encoding and Gigabit Ethernet are described in detail in the book "Gigabit Ethernet" by Rich Seifert, first edition, Addison Wesley Longman, Inc., 1998, incorporated herein by reference in its entirety. It may also be a special control packet, cell, or frame defined within protocols such as the Internet Protocol (IP), Asynchronous Transfer Mode (ATM), or Frame Relay (FR).

In 8B/10B encoding, for example, a specific set of twelve ten-bit codes (control codes) is allocated for control functions such as the MAC layer indication of start of packet or end of packet. However, not all of the twelve ten-bit codes are currently assigned control functions within the IEEE 802.3-1998 standard, incorporated herein by reference in its entirety. Therefore, one of the unused ten-bit codes is directly assignable as the synchronization symbol. Optionally, two ten-bit codes in succession may be used as the synchronization symbol, with the first being a control code and the second being a data code.

Figure 2A:
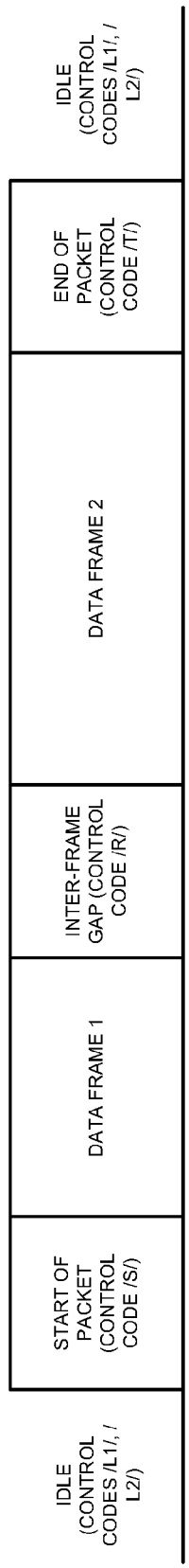
FIG. 2A illustrates representative transmission of MAC layer data frames without prioritized insertion of a synchronization symbol.
Figure 2B:
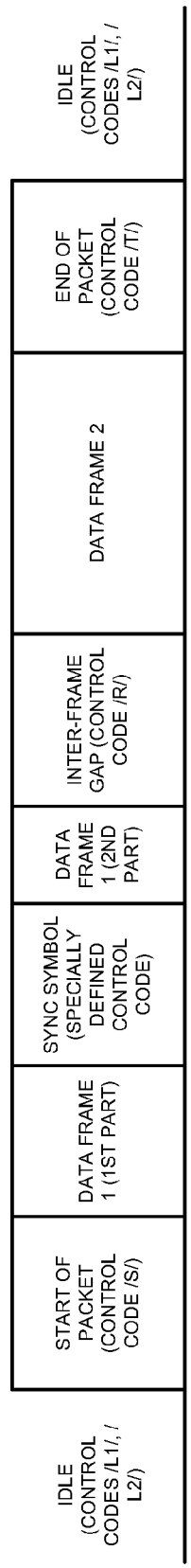
FIG. 2B illustrates representative transmission of MAC layer data frames with prioritized insertion of a synchronization symbol.

The insertion of this synchronization symbol is problematic in Gigabit Ethernet and in all other MAC protocols known to the authors because there is no prioritized insertion of control symbols, e.g. a control symbol cannot be inserted within a data frame in the middle of being transmitted. An example of this for Gigabit Ethernet is shown in FIG. 2A. Control codes delineate the boundaries between Ethernet data frames, where each data frame contains, for example, a packet or packets defined within a higher layer protocol such as the Internet Protocol (IP). (Please note that the usage of the terms "packet" and "frame" in FIG. 2A and in FIG. 2B correspond to the usage of these terms in IEEE 802.3-1998 standard, incorporated earlier in this specification by reference in its entirety. "Packet" in this context refers to a transmission of multiple data frames, not to a packet defined within a higher layer protocol. This is not a standard usage of the term "packet". Elsewhere in this document, the use of the term "packet" corresponds to that defined within a higher layer protocol.) There is no insertion of control codes allowed within a data frame. FIG. 2B shows the same transmission with a synchronization symbol inserted via prioritized insertion in the middle of data frame 1. Prioritized insertion is specifically defined as the insertion of a synchronization symbol before any other queued data or control codes. The insertion of a synchronization symbol, however, does not pre-empt a code that is already in the process of being transmitted. Therefore, there is jitter on insertion of synchronization symbols.

Prioritized insertion is required to limit the worst-case jitter on insertion to 10 bit-times (8 nanoseconds at 1.25 Gigabit per second, the line rate for Gigabit Ethernet). Without prioritized insertion, the worst-case jitter on synchronization symbol insertion becomes the transmission time for a maximum transmission unit (MTU), which is larger than 12,000 bit-times for an often-used MTU of roughly 1600 bytes. If jumbo frames of over 9000 bytes are supported in the future, a worst-case jitter on synchronization symbol insertion becomes larger than 100,000 bit-times. The reduction of this jitter is the primary motivation for prioritized insertion on the MAC layer. Also, insertion of control words on the MAC layer can be done with a minimum of buffering of incoming data, with a minimum of additional complexity at the MAC layer, and without the transfer of any additional complexity to the upper layers that process data packets, cells, or frames. Pre-emptive insertion of a special data packet in the middle of a packet currently being transmitted requires the packet-processing layer to support fragmentation and reassembly, which is unnecessary additional complexity to provide the synchronization function.

The embodiment of a MAC layer device that performs the prioritized insertion of symbols in a MAC layer data stream is given in the last section of this specification entitled "Description of the Luminous Media Access Controller (LMAC)". Specifically, the sub-section within that section that describes this is "SERDES Tx State Machine".

Description of the Other MAC Layer Control Symbols

The purpose of "ping" and "pong" is both as a MAC layer keep-alive mechanism and as an accurate mechanism for measuring propagation delay between adjacent nodes (such as nodes 20 and 21 and FIG. 1B). The "ping" symbol is sent periodically on a configurable interval by each LMAC using prioritized insertion, but with lower priority than the synchronization symbol. The "pong" symbol is sent immediately upon receipt of a "ping" symbol, again with prioritized insertion. The transmit time of the "ping" and the receipt time of the "pong" are latched into registers that are updated at a rate such as 62.5 MHz. The propagation distance on each direction between the adjacent devices can then be estimated by the CPU (CPU 46 in FIG. 6) by dividing the difference between the "ping" transmit and "pong" receive times by 2.

For this clock rate, the maximum jitter on the propagation time measurement is approximately 40 nanoseconds and is due primarily to the 16 nanosecond resolution with which the registers can be latched. This is a very precise MAC layer measurement of propagation time. The main source of imprecision with this method is that if two fibers are used to connect adjacent devices (one per transmission direction), the precision is dependent on the difference in the length of the two fibers. A 16 meter difference in length would result in a propagation time measurement inaccuracy of approximately the same magnitude as the worst case jitter for a 62.5 MHz register update rate.

For robustness in the event of errors that may corrupt a "ping" or a "pong", the software application running on the CPU must conduct multiple measurements and throw out any spurious values that are noted.

The purpose of "receive buffer full" ("RBF") and "receive buffer available" ("RBA") is to provide a link layer on-off flow control mechanism to avoid overflow errors in a receive buffer such as a first-in first-out (FIFO) buffer. An "RBF" is sent by a device when its receive FIFO fills beyond a configurable watermark level. An "RBA" is sent by the same device if its receive FIFO empties beyond a configurable watermark level. Since prioritized insertion is available in the LMAC, the response time of the LMAC when a FIFO fills beyond the "RBF" watermark is much faster (approximately 12 microseconds worst case at 1.25 Gbps for a 1600 byte packet size, assuming no contention with synchronization symbols) than if no prioritized insertion is available.

For robustness in the event of errors that may corrupt an "RBA", the transmitting LMAC that pauses transmission upon receipt of an "RBF" will start transmitting again after a maximum configurable time. If an "RBA" is received prior to this configurable time, the LMAC will begin transmitting sooner. The probability that an "RBF" is corrupted may be handled by sending multiple "RBFs" in quick succession to ensure that at least one of them reaches the destination.

The purpose of "start of control" ("SOC") is to provide a capability for the transmission of high-priority MAC layer control messages. These control messages may be variable length, and are delineated by "SOC" at the start and "end of packet" ("EOP") at the end. These control messages may be inserted using prioritized insertion, and thus may be placed in the middle of an ongoing data frame.

The embodiment of a MAC layer device that performs the prioritized insertion of the symbols described in this section in a MAC layer data stream is given in the last section of this specification entitled "Description of the Luminous Media Access Controller (LMAC)".

Description of Device in the Virtual Network

Figure 3:
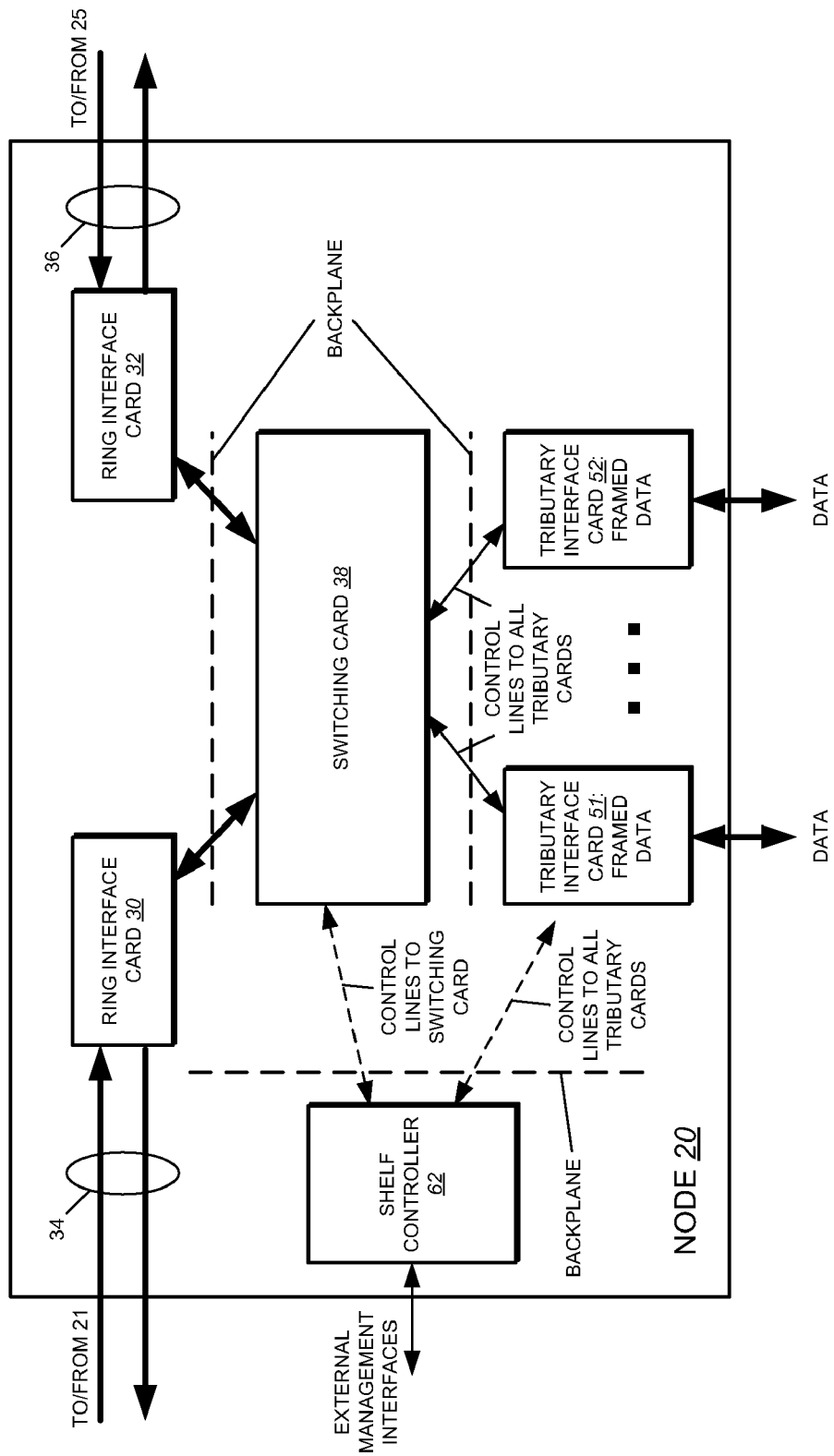
FIG. 3 illustrates pertinent functional units in a device of an LMAC-enabled virtual network.

FIG. 3 illustrates the pertinent functional units within a single device, such as device 20 within the virtual network of FIG. 1B. Each device is connected to adjacent devices by optical interface cards 30 and 32. This particular aspect of FIG. 3 is for a bi-directional ring topology, though there is no inherent limitation to the number of distinct optical interface cards that can be used in a device, and thus no inherent reason that a mesh cannot be supported. These optical interface cards convert the incoming optical signals on fiber optic cables 34 and 36 to electrical digital signals for application to a switching card 38. Each device is also connected to other devices outside the virtual network by tributary interface cards, of which cards 51 and 52 are representative. The incoming signals to the tributary interface cards may be either optical or electrical. If the incoming signal to a tributary interface card is optical, then it converts the incoming signal to an electrical digital signal for application to the switching card 38. The tributary interface cards are also connected to the switching card for control purposes via backplane lines. The shelf controller 62 performs only control functions and is not on the data path. It is connected to the other cards via backplane lines. The control plane protocol may be 100BaseT switched Ethernet. There is also an interface on the shelf controller to an external management system.

Description of Synchronization Symbol Distribution

Figure 4:
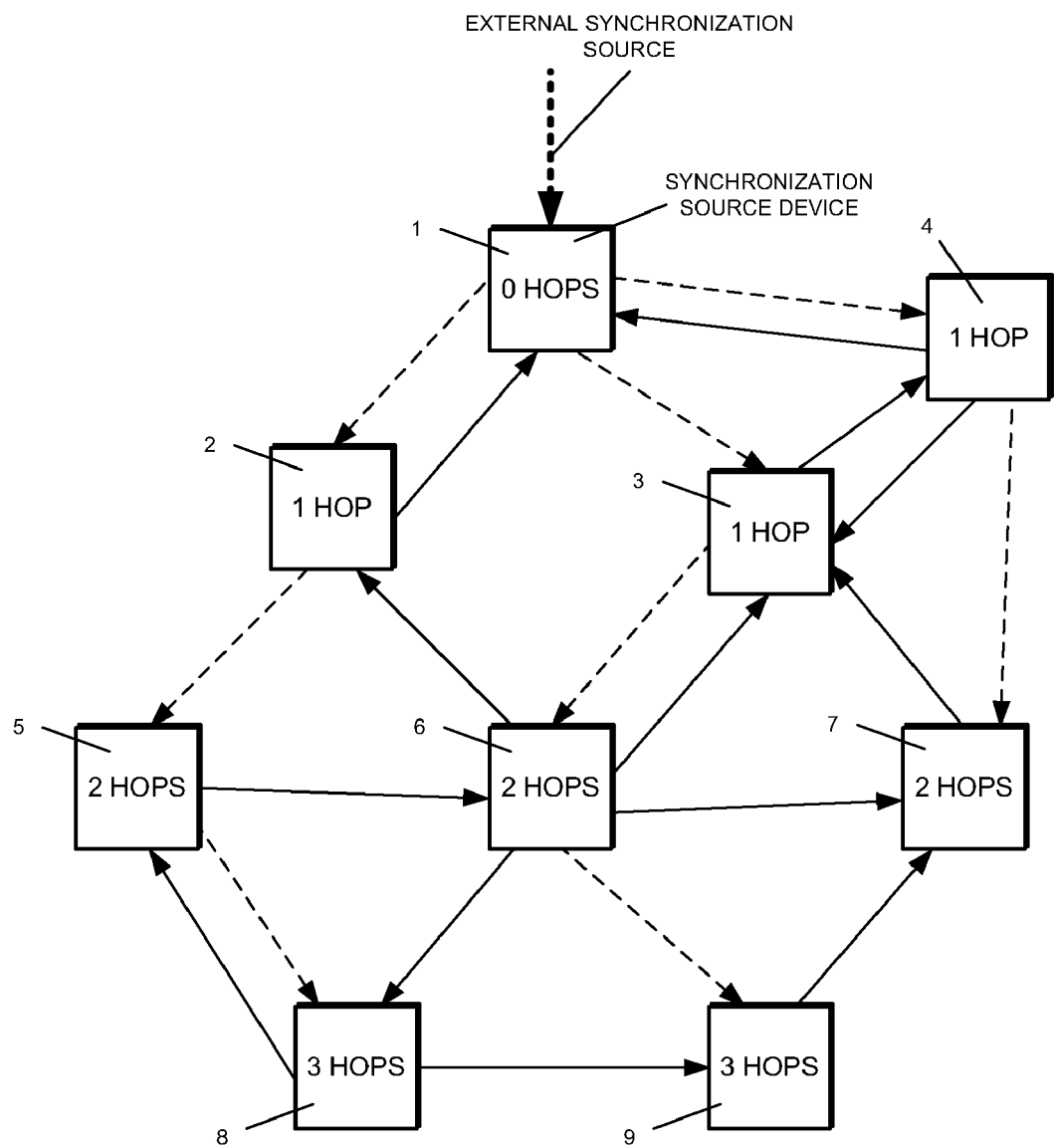
FIG. 4 illustrates synchronization paths for synchronization symbol distribution in a virtual mesh network.

FIG. 4 shows an example of synchronization symbol distribution within a virtual mesh network. The dotted lines show representative synchronization distribution paths (SDPs). The set of SDPs shown are an example of a valid configuration of SDPs for the network in FIG. 3. The criteria that are followed by a valid set of SDPs include: (a) All SDPs originate at a synchronization source device; (b) All devices within the virtual network other than the synchronization source device(s) are on one SDP each, e.g. SDPs do not intersect except at a synchronization source device; (c) SDPs do not loop, e.g. a device accepts synchronization from its SDP on one and only one interface. A single SDP may also have multiple branches. In FIG. 4, the distance in terms of number of hops from any device within the virtual network to the synchronization source device along the SDP connecting the two devices is a least-hop path between these two devices within the virtual network. Optionally, this may not be the case.

There may be multiple least-hop paths available at a given device. For example, device 8 has two 3-hop paths connecting it to the synchronization source device 1, {1, 2, 5, 8} and {1, 3, 6, 8}. {1, 2, 5, 8} is an SDP in its own right and {1, 3, 6, 8}, were it to be used, would be a branch of the SDP that also serves device 9. In this embodiment, device 8 chooses locally which SDP it will be a part of. The criterion used to choose between multiple least-hop paths is arbitrary and is not specified.

A synchronization source device and the interface of that device on which to accept synchronization from an external synchronization source are configured via an external management system through the shelf controller 62 in FIG. 3. A detailed description of the shelf controller and the mechanisms by which an external management system may set configuration parameters in device 20 is described in the co-pending application entitled "An Architecture for Transport of Multiple Services in Connectionless Packet-Based Communication Networks," by Vinay Bannai et al., Ser. No. 09/567,555, filed May 5, 2000, and incorporated herein by reference in its entirety. The synchronization source device then distributes synchronization symbols at a periodic rate based on that received from the external synchronization source (such as 8 kHz) out each of its LMAC-compatible interfaces. The LMACs reside on switching card 38 in FIG. 3. The switching card is described in detail later in this specification. Though the LMACs collect information on synchronization symbols received from other devices in the virtual network in its registers (again described later in this specification), the software application managing synchronization distribution running on the CPU 46 on the switching card (shown in FIG. 6) ignores this information as it is irrelevant to the overall synchronization of the virtual network.

Every other device in the virtual network is notified of which device(s) in the virtual network is the synchronization source device via a broadcast control packet sent by the synchronization source device on the virtual network. This information may piggyback on top of the information already contained in a broadcast neighbor status message used in topology reconfiguration, as described in detail in the co-pending application entitled "Automatic Network Topology Identification by Nodes in the Network," by J. Fan et al., Ser. No. 09/518,956, filed Mar. 3, 2000, and incorporated herein by reference in its entirety. The mechanism used to send and receive the control packet is described in detail in the co-pending application "An Architecture for Transport of Multiple Services in Connectionless Packet-Based Communication Networks," incorporated earlier in this specification by reference in its entirety. Based on the topology reconfiguration method described in detail in the co-pending application entitled "Automatic Network Topology Identification by Nodes in the Network," incorporated earlier in this specification by reference in its entirety, every device in the virtual network independently constructs and validates its own map of the virtual network topology in a plug-and-play fashion (without requiring the presence of an external management system). This is done by a software application running on CPU 46 (FIG. 6) within each device. Once the topology map is obtained, a standard routing algorithm such as Dijkstra's algorithm (described in the book "Interconnections Second Edition" by Radia Perlman, Addison Wesley Longman, Inc., 2000, incorporated herein by reference in its entirety) can be used to determine distances in hops (or more generally, weights or costs) and least-hop paths between any pair of devices in the virtual network. Therefore, each device in the virtual network, based on its knowledge of the virtual network topology, can determine independently from which LMAC-compatible ingress interface to the device it should accept synchronization symbols, based on selection of the interface that is part of the least-hop path to the synchronization source device. As stated earlier in this section, the criterion used to select between multiple least-hop paths is arbitrary and not specified. Each device then distributes synchronization at a periodic rate based on that received from the corresponding ingress interface out each of its LMAC-compatible interfaces.

A device may change the interface from which it accepts synchronization not only due to topology changes (such as the insertion of a new node or the loss of a fiber), but also due to loss of synchronization information on the interface (even if data is still being received at that interface). The mechanism that is used to determine this is described in the section "Description of the Synchronization Block within the Switching Card".

The above-described reconfiguration of synchronization paths may occur in a completely automatic fashion, e.g. without any operator intervention. On the other hand, this may not be desired. Two other modes of synchronization path setup may be used. One is a completely manual approach where every device is configured by an external management system to accept synchronization from a specific LMAC-compatible ingress interface. Another is a mode where a device only changes the interface from which it accepts synchronization when it loses synchronization from the current interface from which it accepts synchronization. Upon initial insertion to the network, a device automatically determines from which interface to accept synchronization based on the least-hop method described above. However, from that point forward the device receives synchronization from the same interface unless synchronization is lost, or unless it is commanded to switch based on configuration from an external management system.

The above approaches work equally well in networks where there are multiple synchronization source devices of the same Stratum level.

There are operational advantages to the fully automated embodiment of synchronization distribution. It is fully integrated with topology reconfiguration as described in the co-pending application entitled "Automatic Network Topology Identification by Nodes in the Network," incorporated earlier in this specification by reference in its entirety. When a change occurs in the network topology, the appropriate LMAC-compatible ingress interface from which synchronization symbols should be accepted at each device is determined as part of the construction of the topology map. The CPU 46 (FIG. 6) on the switching card 38 of that device then directly switches to monitoring the LMAC on that interface. It therefore requires no operator intervention or intervention from an external management system. Since there is an internal lower-level Stratum clock (such as Stratum 3) on each device for purposes of holdover in the event of a loss of synchronization distribution to a device (as described in the section "Description of the Synchronization Block within the Switching Card"), there is no requirement for fast switching. Therefore, the use of a topology reconfiguration algorithm for determination of synchronization paths is perfectly adequate. In addition, a Stratum 3 or higher clock in holdover maintains an excellent approximation to the clock to which it was locked for at least one day, as described in the Telcordia GR-1244-CORE specification, incorporated earlier by reference in its entirety. Therefore, even in the rare event that there is a topology reconfiguration, there is no reason to expect long locking times (or any noticeable degradation in any service) within a device upon a switch from one synchronization path to another.

Description of the Tributary Interface Card

Figure 5:
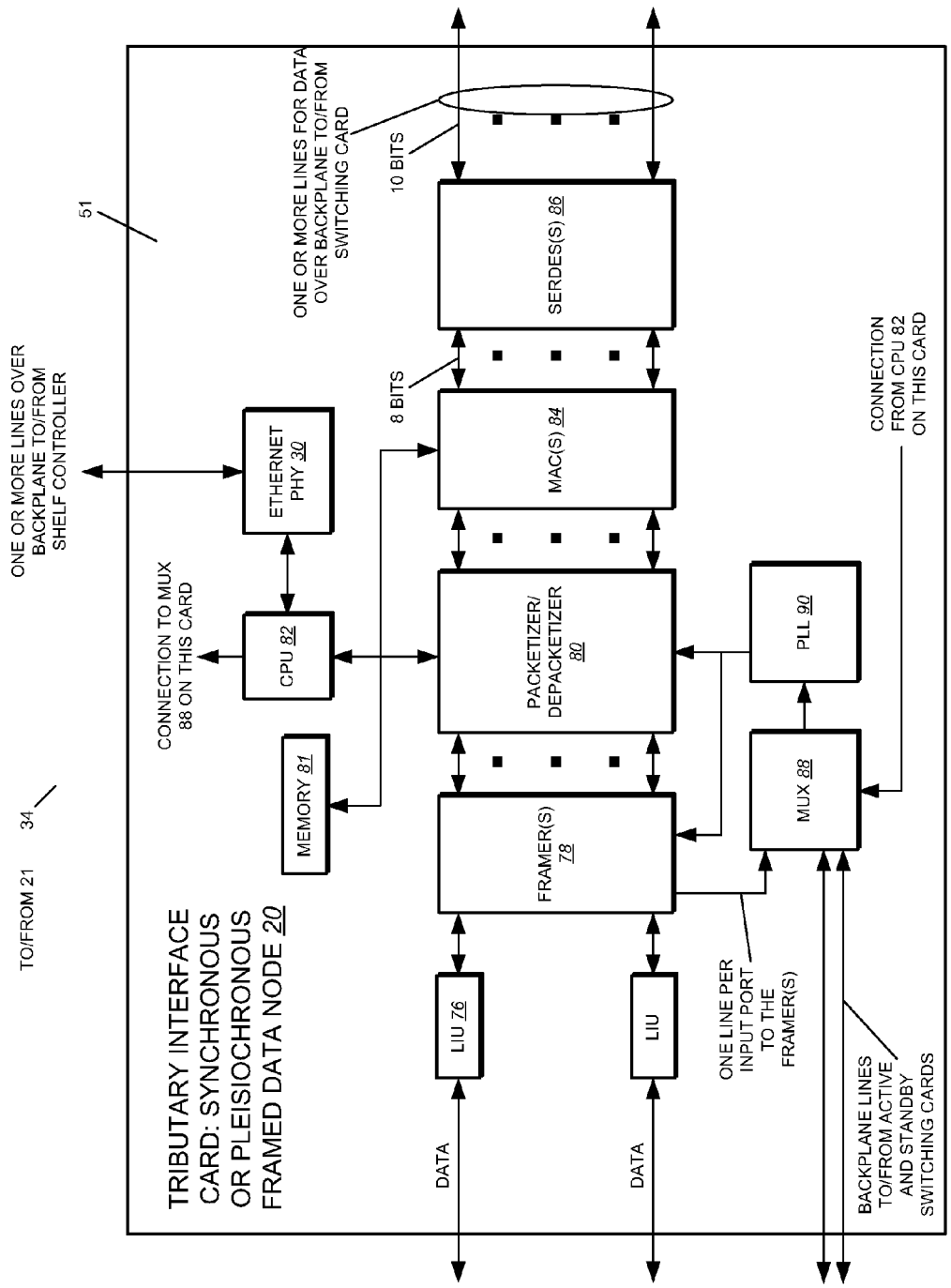
FIG. 5 illustrates additional detail of the tributary interface card in FIG. 3.

FIG. 5 illustrates one tributary interface card for synchronous or plesiochronous framed data 51 in more detail, showing the path taken from ingress data ports interfacing to devices outside the virtual network to the backplane interface between the tributary interface card and the switching card. There may be two sets of backplane interfaces to enable communication with a pair of redundant switching cards for added reliability.

This embodiment of the tributary interface card has multiple DS1 interfaces to devices outside the virtual network. DS1 is a well-known synchronous framed interface and is defined in the Telcordia GR-499-CORE specification, incorporated herein by reference in its entirety. The physical interface is handled by a DS1 Phy device 76, known as a line interface unit (LIU). After the LIUs, the DS1 data enters the framers 78. The function of the framers is to recover frames from input DS1 streams in the ingress direction, or vice versa in the egress direction. The combination of the LIU and framer functions are handled by a transformer, a well-known component, and a framer. The transformer may be a Pulse PE68624 surface mount common mode choke or another comparable component. An example of a suitable framer is a PMC-Sierra 4351 COMET T1/E1 transceiver, whose data sheets are incorporated herein by reference in its entirety.

Following the framer is a packetizer/depacketizer 80. The function of this device is to packetize/depacketize groups of DS1 frames in a fully transparent fashion, e.g. without impacting the bits internal to the DS1 frames in any way. The number of successive DS1 frames from a given port combined per packet is configurable by the CPU 82 and is normally set to 4 frames to trade off between data throughput efficiency (which favors long packets) and reduction in end-to-end delay (which favors short packets to minimize packetization delay). This method of packetizing groups of DS1 frames in a transparent fashion is a key decision made in the formulation of this architecture. This is a much simpler model for DS1 transport than systems that process individual DS0s within the DS1. The transparent transport of DS1s makes the virtual network appear as a wire with a constant latency for any given DS1 crossconnect. To ensure that there are no frame slips, it is necessary to buffer enough DS1 frames for each output DS1 port at the egress to the virtual network to compensate for the worst-case jitter through the network. The amount of buffering required is straightforward to estimate either through network simulation or through analytical estimation.

The packetizer/depacketizer may be implemented as an FPGA or as an ASIC. The preferred embodiment is divided into two parts, a transmit FPGA and a receive FPGA. This implementation is described in detail in the co-pending application "An Architecture for Transport of Multiple Services in Connectionless Packet-Based Communication Networks," incorporated earlier in this specification by reference in its entirety.

Figure 7:
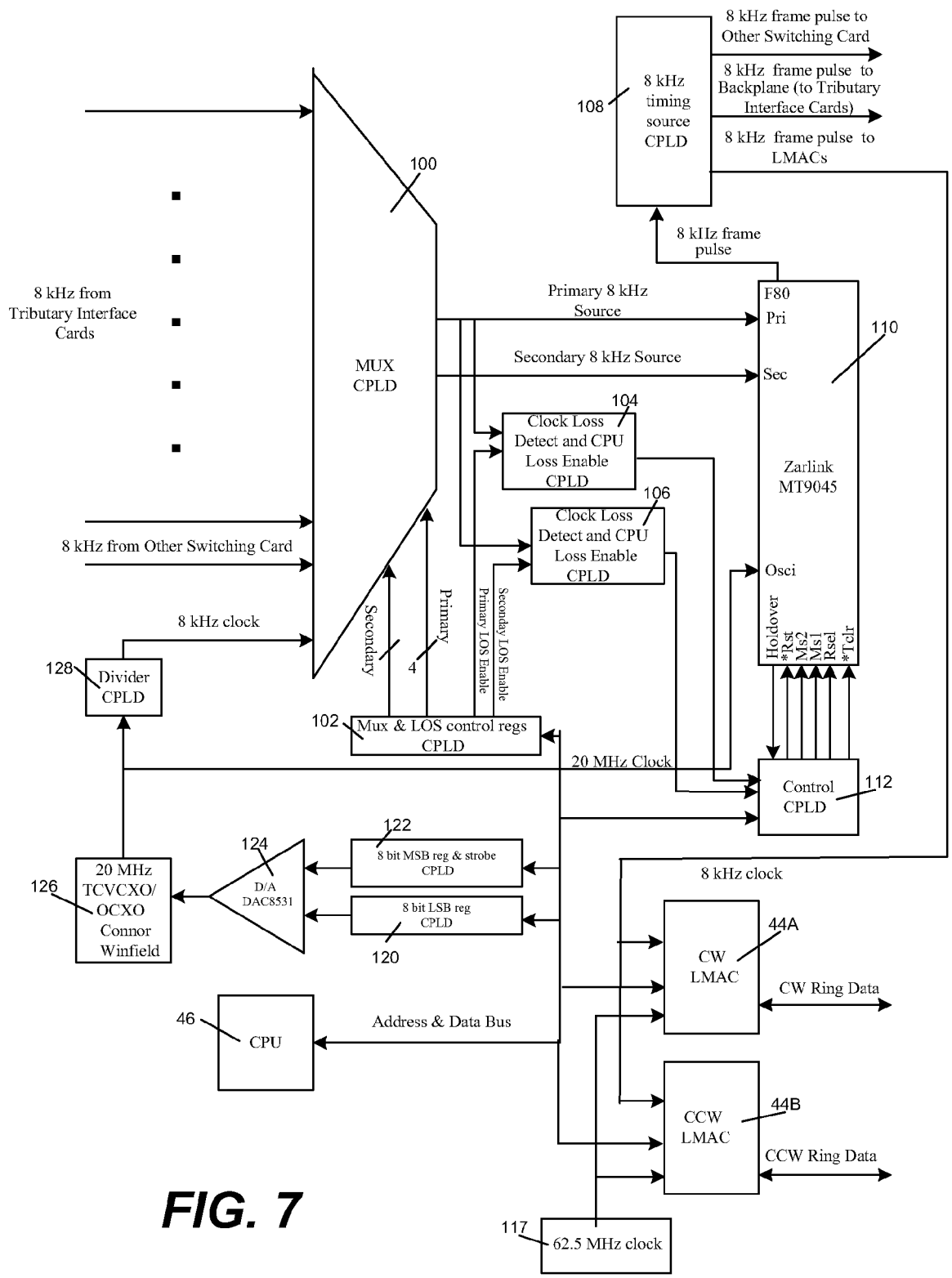
FIG. 7 illustrates additional detail of the synchronization module on the switching card in FIG. 5.

A memory 81 in FIG. 7 represents memories in the node other than that used for the lookup tables, although it should be understood that there may be distributed SSRAM, SDRAM, flash memory, and EEPROM to provide the necessary speed and functional requirements of the system.

The CPU 82 is connected to a quad Ethernet Phy device 83 such as the AM79C875KC by Advanced Micro Devices or any other suitable type. This device connects the tributary interface card to a management network backplane interface, or optionally more than one for purposes of redundancy. The CPU is also connected to the framer 78, the packetizer/depacketizer 80, and the MAC 84. Via its connection to the packetizer/depacketizer, the CPU is able to set the values in the headers used to encapsulate the DS1 frames.

A media access controller (MAC) 84 converts from the parallel 32-bit Generic Gigabit Interface (GGI) at the output of the packetizer/depacketizer 80 to the parallel 8-bit interface required at the input to the serializer/deserializer (SERDES) 86, and vice versa. MACs are well known and are described in the book "Telecommunication System Engineering" by Roger Freeman, third edition, John Wiley & Sons, Inc., 1996, incorporated herein by reference in its entirety. There is no requirement that the MAC on the tributary interface card have the special capabilities of an LMAC.

The parallel output of the MAC 84 is converted into a serial stream of bits and vice versa by a serializer/deserializer (SERDES) 86. The SERDES 86, in one example, converts a parallel group of 8 bits from the MAC 84 to a serial stream of 10 bits using a table, and vice versa. The 10 bit codes selected to correspond to 8 bit codes meet balancing criteria on the number of 1's and 0's per code and the maximum number of consecutive 1's and 0's for improved performance. For example, a large number of sequential logical 1's creates baseline wander, a shift in the long-term average voltage level used by the receiver as a threshold to differentiate between 1's and 0's. By utilizing a 10-bit word with a balanced number of 1's and 0's on the backplane, the baseline wander is greatly reduced, thus enabling better AC coupling of the cards to the backplane. The SERDES 86 may be a model VSC 7216 by Vitesse or any other suitable type. The data sheet of the Vitesse VSC 7216 is incorporated herein by reference in its entirety.

The DS1, as a synchronous interface, must have an 8 kHz synchronization source available for distribution to the framer and to the packetizer/depacketizer. This synchronization source may be provided via an external Building Integrated Timing Source (BITS) or GPS clock connected to the device, or via an internal timing source located within the device that can distribute timing over the backplane. External BITS clocks, GPS clocks, and internal timing sources are well-known. These types of timing sources are described in the book "SONET" by Walter Goralski, McGraw-Hill, 1997, incorporated herein by reference in its entirety. At the synchronization source device (device 1 in FIG. 4), synchronization is obtained from an external BITS clock or GPS clock connected to a DS1 data port. At any other device in the virtual network (devices 2–9 in FIG. 4), synchronization is obtained from a backplane line from a switching card 38 in FIG. 3.

A multiplexer 88 on the DS1 card is configurable by the CPU 82 to accept synchronization from a DS1 input port on the same card or from a backplane line from a switching card 38. There is a separate line for each DS1 input port from the framer 78 to the multiplexer 88. Another backplane line is available for a redundant switching card. In the event that synchronization is accepted from a DS1 input port on the same card, the multiplexer enables the distribution of this synchronization source onto the backplane so it is available to the switching card(s).

The output of the multiplexer enters a Mitel 9041AP Output Trunk Phase-Locked Loop (PLL). The PLL accepts an 8 kHz clocking input and generates an 8 kHz output, a 1.544 MHz, and an 8.192 MHz output for T1 clocking to the framers and to the packetizer/depacketizer.

Description of the Switching Card

Figure 6:
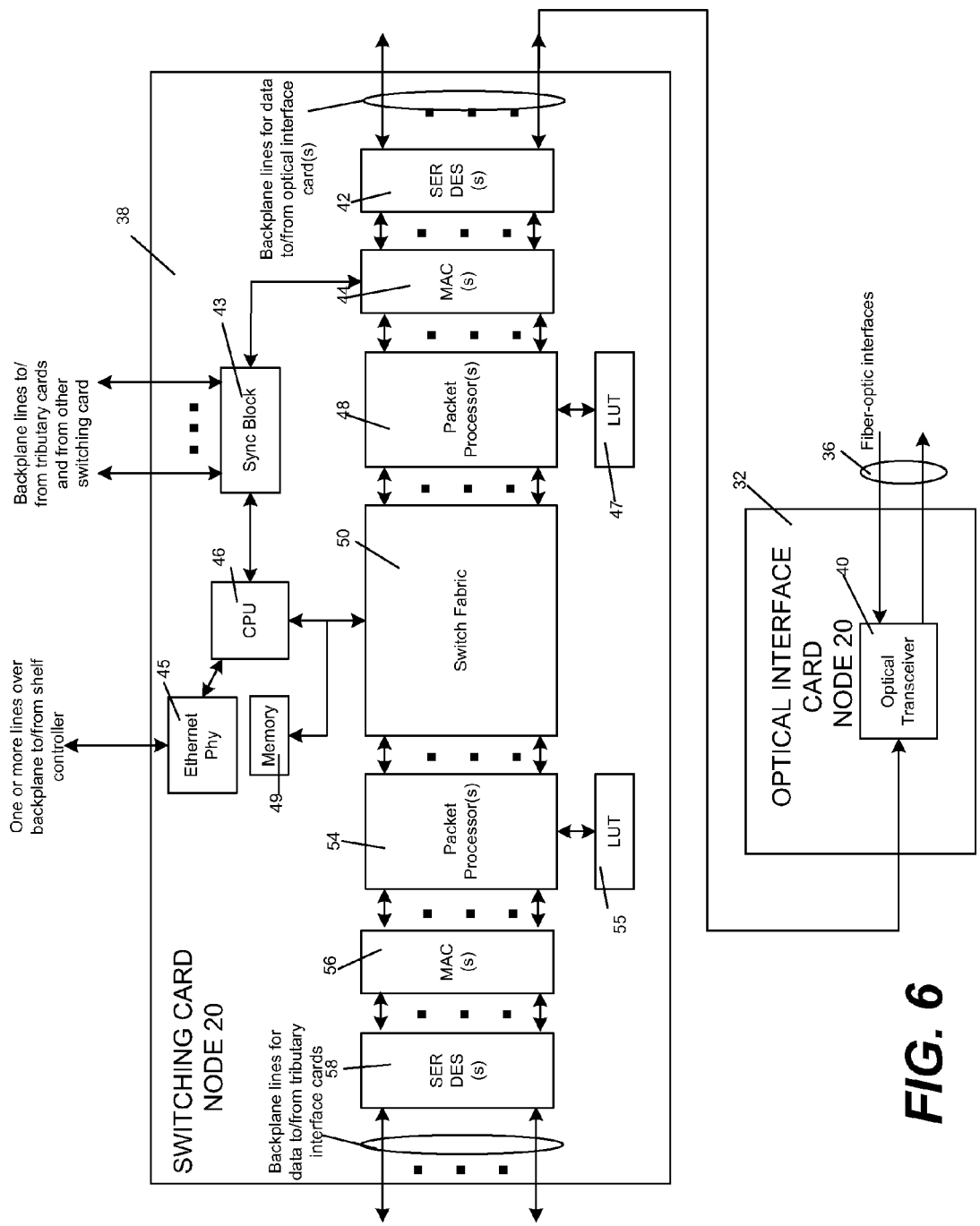
FIG. 6 illustrates additional detail of the switching card in FIG. 3.

The switching card is shown in FIG. 6. Incoming packets to the switching card from the backplane interface to the tributary interface cards pass through a SERDES 58 and a MAC 56 that correspond to earlier descriptions of those components. There is no requirement that the MAC on the tributary interface card have the special capabilities of an LMAC. An example of a suitable packet processor 54 is the XPIF-300 Gigabit Bitstream Processor by MMC Networks, whose data sheet is incorporated herein by reference in its entirety. The packet processor 54 interfaces with an external memory 55 (a look-up table) that contains routing information to route data to its intended destination.

The output of packet processor 54 enters the switch fabric 50. One suitable packet switch is the MMC Networks model nP5400 Packet Switch Module. In one embodiment, four such switches are connected in each switching card for faster throughput. This embodiment is used on the switching card. The capabilities of this switch are not critical to this specification.

The CPU 46, the Ethernet Phy 45, the packet processor 48, the lookup table 47, the memory 49, and the SERDES 42 correspond to earlier descriptions of these components on the tributary interface card for packetized data.

The MAC 44 may be multiple physically separate LMACs, one on each connection to an optical interface card 32. It may also be a single physical chip such as a Xilinx XCV400-6BG560C Virtex FPGA on which one or more instances of the LMAC are implemented. The LMAC FPGA implementation described later in this specification in the section "Description of the Luminous Media Access Controller (LMAC)" may be implemented on such an FPGA.

In the case of the switching card, the CPU 46 does have connections to both the MAC devices 44 and 56. It also has a connection to a sync block 43. The sync block and its interfaces is described in the following section "Description of the Synchronization Block within the Switching Card". The description of this block along with the subsequent description of the LMAC contains the bulk of the hardware description required for this specification.

The SERDES 42 interfaces across the backplane with the optical interface card 32. FIG. 6 illustrates one optical interface card 32 in more detail showing the optical transceiver 40. An additional switch in card 32 may be used to switch between two switching cards for added reliability. The optical transceiver may be a Gigabit Ethernet optical transceiver using a 1300 nm laser, commercially available. FIG. 3 shows an embodiment of device 20 that is used in a bi-directional ring topology. A device 20 with more than two optical interface cards may be used in a mesh topology or interconnected ring topology.

The packet processor 48 does not change incoming packets from the switch fabric 50. It sends those packets directly to MAC 44. The packets then go through SERDES 42, through the optical interface card 32, and out onto the virtual network. However, packet processor 48 does play a critical role for incoming packets from the optical interface card 32. Packet processor 48 determines if these packets are destined for the device 20 ("drop" traffic) or if they are to be passed on to other devices ("pass" traffic). This is described in detail in the co-pending application "An Architecture for Transport of Multiple Services in Connectionless Packet-Based Communication Networks," incorporated earlier in this specification by reference in its entirety.

Description of the Synchronization Block within the Switching Card

FIG. 7 shows a detailed diagram of the components directly involved in synchronization functions on the switching card 38. The components shown in FIG. 7 include the internals of the sync block 43, the CPU 46, and the MACs 44 in FIG. 6.

A Mitel 9044 switchover phase-locked loop (PLL) 110 is used to generate the 8 kHz frame pulse or clock that is distributed over the backplane from the switching card. The data sheet of the Mitel 9044 is incorporated herein by reference in its entirety. The F8o output of the Mitel 110 enters a complex programmable logic device (CPLD) 108. All of the blocks denoted with CPLD can be implemented on a single physical CPLD such as a Xilinx 95144XL. Output lines from the CPLD 108 connect to lines on the backplane for distribution of the 8 kHz clock to all of the tributary interface cards (though tributary interface cards for packetized data 52 in FIG. 3 do not use it) and to the redundant (backup) switching card. In addition, output lines from the CPLD 108 connect to the LMACs 44A and 44B. This is the 8 kHz clock that commands the sending of synchronization symbols on the ring from the LMACs.

The Mitel 110 has a primary and secondary frequency source and a primary and secondary loss of signal (LOS) input that it locks to using a stable 20 MHz clock 126. The primary frequency source to the Mitel 110 is selected using a multiplexer 100 implemented in CPLD. The selection options for the multiplexer 100 are: (a) one of the tributary interface card 8 kHz clocks (only tributary interface cards for synchronous/plesiochronous interfaces such as DS1 are valid choices for this); (b) 8 kHz frame pulse from the other ring card; and (c) 8 kHz clock from the divided down 20 MHz clock. The multiplexer is configured via control registers 102 set by the CPU 46. The method used by CPU 46 to determine how to configure these registers is described later in this section.

The primary frequency source selected from the mux 108 goes to the Mitel part and also to an CPLD 104 that can detect loss of signal. The CPLD 104 can then feed an indication of LOS to the Mitel part. This CPLD also is controllable by the CPU to be able to assert loss of signal to the Mitel part. An identical arrangement is used for the secondary frequency source. The method used by CPU 46 for synchronization reference switching is described later in this section.

The Mitel part also is controllable from a CPLD register addressable by the CPU. Functions controlled by this register are: (a) *TCLR—Time Interval Error (TIE) clear and reset; (b) MS1 and MS2—mode select; (c) RSEL—Reference source select; (d) *RST—reset. The HOLDOVER is an input to a CPLD register readable by the CPU 46 that indicates that the Mitel 9044 has switched to holdover mode. These functions are described in the data sheet of the Mitel 9044, incorporated earlier by reference in its entirety.

The 20 MHz frequency source 126 will be either an oven-controlled crystal oscillator (OCXO) to meet Stratum 3E internal clocking requirements or a temperature-controlled voltage-controlled crystal oscillator (TCVCXO) to meet Stratum 3 internal clocking requirements. Parts that may be used to provide these functions are MTI-Milliren parts; the OCXO is the 220 Series OCXO and the TCVCXO is the 210 Series mini OCXO.

The output of the 20 MHz oscillator is divided down to 8 kHz in a CPLD 128, with the 8 kHz then provided as an input to the CPLD mux 108.

The voltage control input to the 20 MHz OCXO/TCVCXO 126 is from the digital to analog converter (DAC) 124. An example of a component that can be used for this function is the Analog Devices 8562, a 12-bit parallel DAC.

The DAC is programmed using a CPLD 120 and 122 that has the lower 8 DAC bits latched in one CPU operation and the upper 4 DAC bits latched in another CPU operation. The latching of the upper 4 bits also generates an active low pulse on *CE to the DAC8562. This pulse is a minimum of 40 nanoseconds.

The LMAC takes as an input a 62.5 MHz clock 117. This oscillator may be free-running and does not need to be temperature controlled, e.g. it can drift in a range of +/−50 parts per million. Such oscillators are well known. A representative component that performs this function is the Abracon ACHL-62.50 MHz-CA.

Each synchronization symbol received from the ring is represented as 8B/10B control code K23.7. Upon each detection of this code at the Vitesse 7216 SERDES device, the LMAC is informed via the appropriate bits on the incoming Err/Kch/Idle and RX_DATA lines. The LMAC will measure the time between a configurable number of received synchronization symbols using a 24-bit counter (split into an 8-bit counter and a 16-bit counter) running at 125 MHz. The configurable number of synchronization symbols (decimation factor) is set using a 10-bit counter. It is expected that the configurable number of synchronization symbols will be set to 100, and thus that the interval between LMAC sample points will be 12.5 ms (the ticks are arriving off the ring at a frequency of 8 kHz). The LMAC will latch the 24-bit counter value into a holding register upon the number of received synchronization symbols reaching the configurable value. In a similar fashion, the LMAC will also measure the time between a configurable number of transmitted synchronization symbols, where again it is expected that the configurable number of synchronization symbols will be set to 100.

Upon latching of the receive tick counter, an interrupt would be generated to the CPU. Likewise, the send tick counter latching generates an interrupt. These interrupts may be masked by the CPU. The interrupts are visible to the Luminous Hardware Abstraction Layer (LHAL), which will generate high-priority events to the application that updates the software PLL. This application must store the send and receive 24-bit counter values from the previous latching event (100 synchronization symbols earlier) so that the number of 125 MHz ticks that it has taken to send the last 100 synchronization symbols can be computed for both transmit and receive. The error signal to be processed by the PLL loop filter is the difference between these two values. This application will contain error thresholds so that spurious difference values created by the loss of a synchronization symbol or the spurious generation of a synchronization symbol on send or receive will not be used for updating the PLL.

The CPU 46 implements the loop filter of the PLL. Representative equations that may be implemented in a software application on the CPU to determine how to drive the DAC 124 for an active proportional-integral loop filter are:

$$VcoIn = Ki*ErrInt + Kp*Err$$

$$ErrInt = ErrInt + DEC\_FACT*Err$$

Err is the error between the time (converted to seconds) between the number of 125 MHz ticks that it has taken to send the last 100 synchronization symbols on transmit and to receive the last 100 synchronization ticks on receive. In the event that there is a spurious difference due to the loss of a synchronization symbol or the spurious generation of a synchronization symbol, Err will be set to 0. DEC_FACT is the configurable number of synchronization symbols between measurements, or the decimation factor. It is equal to 100 in this example. ErrInt is the error integral over time. Ki is defined as $(omega\_n/(0.5*loop\_freq))^2$, and Kp is defined as $2*damp\_fact*(omega\_n/(0.5*loop\_freq))$, where omega_n is the PLL cutoff frequency in Hz (may range from 0.001 Hz to 2 Hz for representative loop filters), loop_freq is the update rate of the PLL in Hz (8 kHz in this example), and damp_fact is the damping factor of the PLL (may range from 3.0 to 6.0 for representative loop filters).

The above equations are easily derivable based on the description of PLLs in the book "Phase-Locked Loops: Design, Simulation and Applications" by Ronald Best, fourth edition, McGraw-Hill, 1999, incorporated herein by reference in its entirety.

After the loop filter, the value VcoIn may be further scaled so that the DAC is driven at the appropriate level. A mapping between VcoIn values and DAC drive levels is easily determined through characterization of the DAC in the laboratory.

Setting of the Mux CPLD 100 by CPU 46

The mux input from the TCVCXO/OCXO via the divider CPLD 128 is set to be the primary synchronization source on the active switching card for nodes not located in a Central Office (CO), e.g. a synchronization source device. The primary source for the standby (redundant) switching card would be the 8 kHz output of the active switching card, e.g. one of the outputs of CPLD 108 sent over the backplane from the active switching card to the standby switching card.

External synchronization via a tributary interface card such as a DS1 card would be the primary and secondary sources in a synchronization source device for the active switching card. The standby switching card would use the 8 kHz output of the active switching card as the primary source and the DS1 card serving as the primary source for the active switching card as its secondary clock source.

How CPU 46 Handles Synhronization Reference Switching

There are a variety of synchronization reference loss and degradation scenarios. The first is the total loss of the DS1 card from which the primary sync reference is obtained, or the total loss of the primary sync reference for some other reason on the path between the DS1 card and the ring card. In this case, the clock loss detect CPLD shall assert LOS to the Mitel 9044 and update a synchronization status register after missing between two and four expected 8 kHz transitions. It shall also update the synchronization status register after detecting at least four successive 8 kHz transitions after a period of LOS, but shall not deassert LOS to the Mitel 9044. The CPU will poll the synchronization status register at a period of between 10 milliseconds and 50 milliseconds. The Mitel 9044 will automatically enter holdover mode independently of the LOS indication. (The criterion for entering holdover mode is if the reference drifts more than +/−36,000 ppm from the Mitel internal reference. The holdover frequency in the event of LOS will be the frequency of the reference prior to LOS.) The delay from loss of the primary sync reference to switchover to the secondary sync reference is determined by the guard time adjustment circuit used with the Mitel 9044. The guard time shall be set to 100 milliseconds. This 100 milliseconds starts from the time that LOS is asserted by the clock loss detect CPLD.

After switchover to the secondary reference, a software application running on the CPU 46 will handle the rearrangement of the secondary reference as the primary and the selection of the new secondary. As part of this rearrangement, the CPU will command primary and secondary LOS at different times via the primary LOS and secondary LOS enable lines. The CPU is responsible for keeping track of the status of each DS1 card (received from the shelf controller 62 in FIG. 3) and for selecting which DS1 card will serve as the new secondary and setting the appropriate mux control registers.

Upon return of a synchronization reference from LOS, the CPU will determine when and if to remove the LOS indication through a command to the clock loss detect CPLD.

The Accunet T1.5 specification describes sync reference degradation scenarios other than LOS. These include error bursts above a specified duration and input jitter above specified tolerances. Detection of these degradations occurs on the DS1 card. If a port becomes disabled or degraded, switching between ports on a DS1 card takes place directly on that card.

In the event of synchronization reference drift, auto-holdover mode is enabled on the Mitel 9044 after a drift of approximately +/−300 ppm. The auto-holdover frequency is +/−273 ppm from the accurate DS1 frequency. The holdover pin is not asserted. To detect such a scenario, an indication must be communicated from the DS1 card itself. Via the PMC Comet framer on the DS1 card, drift of +/−230 ppm is detectable. This will cause a switch to a new port on the DS1 card. In the interim, this condition will be communicated to the ring CPU via the internal control plane. The CPU will force a switch to a different card if possible.

The CPLD FPGA modules described above have been broken down into functional blocks simple enough for one of ordinary skill in the art to fabricate, since the programmable logic required to implement each block is well-known.

Description of the Luminous Media Access Controller (LMAC)

Introduction

The LMAC provides a bus-protocol translation and buffering function between the 32-bit synchronous GGI bus interface of the MMC XPIF (please see pages 29–39 of the XPIF-300A3 Datasheet) and the 8-bit interface of the Vitesse SERDES 7216 device (pages 4, 5, 10 and 15 are particularly instructive). Data sheets on both of these components have been incorporated earlier by reference in their entirety.

The GGI bus defines two unidirectional 32-bit data busses, one bus for transmit data (data from XPIF to LMAC) and one bus for receive data (data flows from LMAC to XPIF).

The data protocol is essentially the same in both directions. The XPIF is the initiator of the data transfer when it is transmitting data. The GGITXV_L signal (transfer valid) is asserted to indicate that a 32-bit word is valid on the GGI Transmit Bus (GGITXD). A 32-bit word is transferred every clock when GGITXV_L is valid; the clock rate is 52 MHz. Data transfers from the XPIF to LMAC maybe throttled by the LMAC by asserting the GGI_TX_FULL_L signal. There is a two-clock pipeline delay for halting and starting data transfers when GGI_TX_FULL_L is asserted.

A frame being transmitted by the XPIF is preceded by a special 32-bit control word (TXSOF) and terminated by a special 32-bit control word (TXEOF) on the GGI Transmit bus. Transmit data transfers maybe throttled by the LMAC by asserting the TXFULL_L signal to the XPIF, when a single LMAC is attached to an XPIF. Unfortunately, when two LMACs are attached to a single XPIF, the XPIF ignores the TXFULL_L signal, once a transfer starts. In other words, the LMAC must be capable of accepting a maximal sized Frame (1522 Byte Ethernet MTU plus Ring Header Bytes; e.g. 1600 Byte Transmit Buffer).

The XPIF may also throttle data transfer on transmit by deasserting GGITXV_L, i.e. it is not required to transfer a data word every clock.

When data is received by the XPIF from the MMC GMAC-B3 Gigabit Media Access Controller, the protocol is essentially symmetric, except that the format of the control words that precede and terminate a packet (RXSOF and RXEOF respectively) are slightly different for the GGI Receive Bus. The data sheet of the MMC GMAC-B3 is incorporated herein by reference in its entirety. Another complication when data is received by the XPIF (frame is received) is that the LMAC must assert the RX_FAV_L signal and the XPIF must assert the RX_GO_L signal before data is sent to the XPIF from the LMAC, but only in a dual LMAC configuration.

Transmit data from the XPIF is stored in to a Transmit FIFO. The TXSOF and TXEOF control words on the GGI Transmit Bus are written into the Transmit FIFO, with the control signals SOP (start of packet) and End of Packet (EOP) set. These data words are not transmitted by the SERDES, (so in fact any data maybe written), but used only to delimit packet boundaries. The EOP word indicates the number of valid bytes in the last word (i.e. word preceding the EOP word) of the packet and should be used to terminate transmission on the correct byte boundary.

Data is read out of the Transmit FIFO and sent to the Vitesse SERDES device a byte at a time at 125 MHz (actually, it is really transferred at 62.5 MHz on both edges of the clock). The transmit interface to the Vitesse is simple. There is a 8-bit transmit data bus and a Command/Data signal which indicates whether the 8-bit bus is data or a "special K" character (out of band control character). The "special K" character for Start of Packet (K27.7) must precede the first byte of a frame, and the "special K" character for End of Packet (K29.7) must terminate a frame. When data is not being sent, the "special K" character for Idle must be sent by driving the Command/Data line to Command and the 8-bit Transmit Data bus to be "101 11100".

The design of the Transmit interface to the Vitesse SERDES device must also include preemptive insertion of "special K" characters in to the Transmit data stream. For example, "special K" characters are transmitted to perform "heartbeat" and "timing synchronization" functions. Conversely, when these "special K" characters are received by the Vitesse SERDES, a "special K" character maybe required to be immediately sent in response by preemptively inserting it in to the transmit data stream. Also, a link level flow control mechanism (XON/XOFF) is implemented when the Receive Buffer hits a watermark. The transmitter must be turned off before the Receive Buffer overflows, by transmitting a "special K" character. The delay time of the XOFF character in reaching the source of the data for the Receive Buffer times the Gigabit data rate may require a very low watermark on the Receive Buffer before a XOFF "special K" character is transmitted.

The Receive Interface from the Vitesse SERDES device essentially consists of an 8-bit receive data bus and 4 control signals, RSDET, ERR, KCH, IDLE. Data is transferred on both edges of the clock at 62.5 MHz, which is conceptually equivalent to a byte transfer at a 125 MHz rate. Internal to the FPGA, the SERDES interface is clocked at 125 MHz by use of a delay-locked loop.

When the RSDET signal is not asserted, there is no incoming signal to the SERDES and the ERR, KCH and IDLE signals have no meaning. When RSDET is asserted, the ERR, KCH and IDLE signals indicate by a truth table, how to interpret the received byte. The truth table indicates whether a received byte is a valid data byte, or an underrun/overrun error has occurred, a special "K" character other than IDLE was received, or an IDLE was detected, or an out of band error or disparity error or loss of synchronization was detected.

When a "Start of Packet", "special K" character is received (ERR/KCH/IDLE="010"), the 8-bit data on the Receive Data bus from the SERDES is loaded into a 16-bit pipeline register to match the 16-bit datapath width of the Receive FIFO. (The datapath width is a tradeoff based on the RAM granularity available in the FPGA technology and FPGA device chosen). Successive data bytes of the packet are assembled in the 16-bit pipeline register and written to the Receive FIFO. The packet is delimited by the "End of Packet" "special K" character. The "EOP" and "SOP" control signals are asserted when writing to the Receive FIFO to delimit packet boundaries. Furthermore, an indication of whether the "End of Packet" byte is in the high order or low order 16-bits of the input pipeline register to the Receive FIFO is made.

The Receive FIFO maybe smaller than the maximal packet size, (approximately 512 bytes in the dual LMAC case). This implies that a link layer flow control (XON/XOFF) is necessary to avoid Receive FIFO overflow errors. Fortunately, the dual LMAC scenario occurs only over the midplane, which limits the maximum latency time for a Transmitter to respond to the XOFF (the "Receive Buffer Full") message. 512 Bytes at 125 MHz is about 4000 ns. When the Receive FIFO reaches the "Half-Full" mark, (or some other watermark TBD), a "Receive Buffer Full" "special K" character is sent to the source of the data going into the Receive FIFO. That transmitter than turns off transmission until it sees a "Receive Buffer Available" "special K" character.

Error conditions on the SERDES Receive Interface are signaled to the SERDES Receive Error Block, where several independent counters maintain a count of the various error conditions on the SERDES Receive Interface.

Received data is read out of the 16-bit wide Receive FIFO and assembled into 32-bit words for transfer to the XPIF via the GGI RX bus. The RXSOF and RXEOF words required by the GGI RX bus protocol are generated from the "EOP" and "SOP" control outputs of the Receive FIFO.

The LMAC also sends periodic "special K" characters called "Ping" over the SERDES Transmit interface to its neighboring LMAC; the frequency of transmission is on the order of 1 ms. An LMAC that receives a "Ping" "special K" character is required to immediately send a "Pong" "special K" character in response over its SERDES Transmit interface (i.e. send a "Pong" to the sender of the "Ping").

Periodic "TICK" "special K" characters for network synchronization are transmitted over the SERDES transmit interface based upon a 8 KHz square wave clock input called "TICK_IN". A count of these "TICK_IN" inputs are kept. A separate count of the number of "TICK" characters received from the SERDES interface is maintained. These counters are used as part of a PLL circuit that provides control information to a VCO, which in turn keeps a local clock synchronous to the network clock.

Description of Major Blocks

Figure 8:
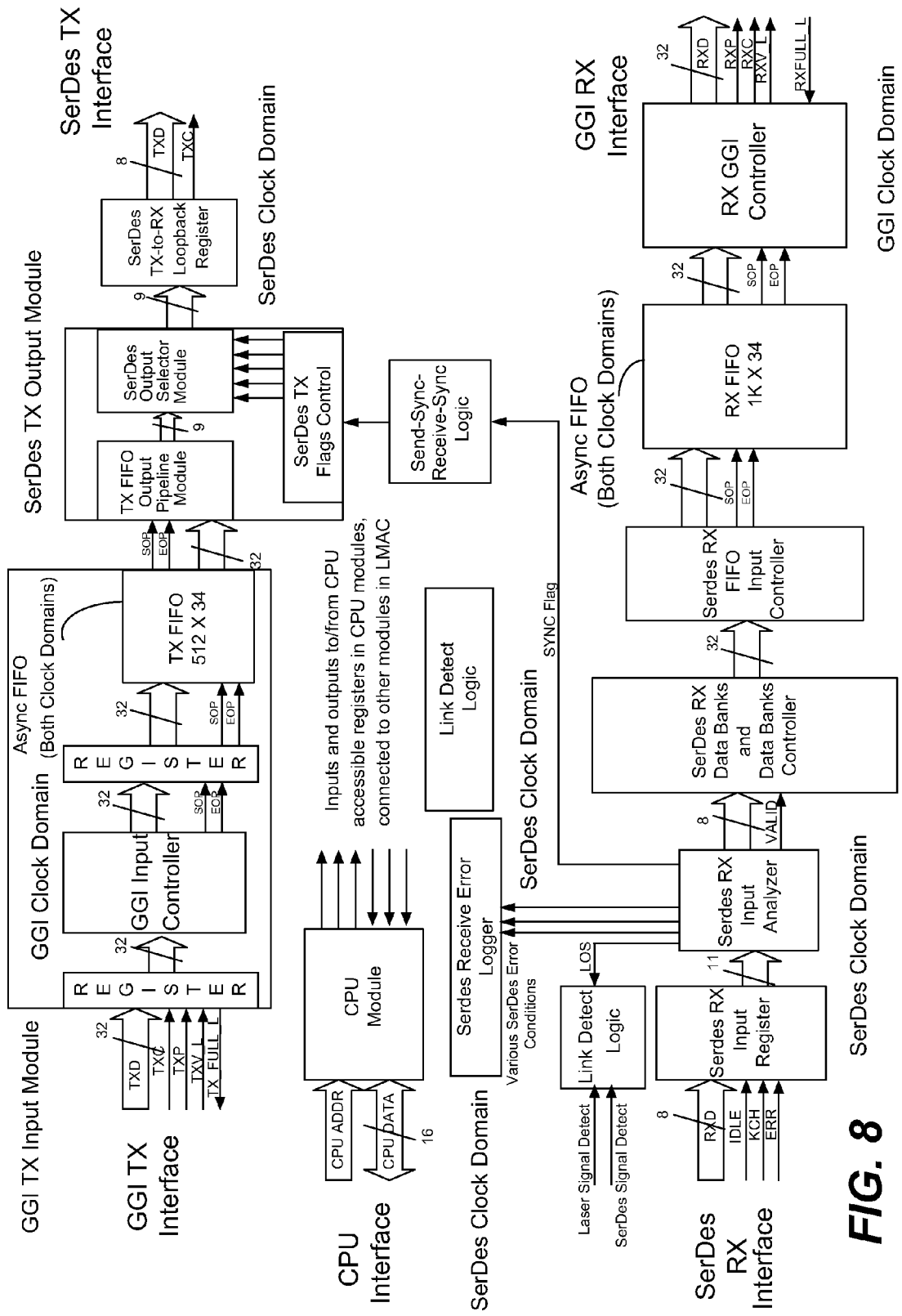
FIG. 8 illustrates an FPGA implementation of the LMAC.

A block diagram of the LMAC datapath which has been machine generated by Synplicity based on the partitioning of the LMAC is provided as FIG. 8. It may be helpful to reference that block diagram in conjunction with the following sections.

Register Block

The register block implements the Command and Status Registers defined in the "LMAC Programmer's Manual" section below.

The CPU Interface consists of a 16-bit bi-directional I/O bus "mpd[15:0]" and associated control signals generated by the PPC860 CPU. The clock input "clk" to the Register Block is assumed to be asynchronous to the "as_1", "cs_1", "rd_wr_1" and "mpad[10:0]" signals from the PPC 860, which indicate when the address bus "mpad" is valid, when the decode of the higher order address bits is valid, and whether the operation is a read or write respectively.

There are about 22 registers in the Register Block.

It should be noted that for the PPC860 processor, the most significant bit is on bit[0] and the least significant bit is on bit[15]. This is true for both address and data. Internally the least significant bit is on bit[0]. Appropriate swapping of the address and data bits should be performed in the Register Block.

GGI TX State Machine

The GGI Tx State Machine transfers data from the XPIF to the LMAC via the synchronous GGI Transmit Bus. The ggi_txv_1 signal indicates when there is valid data on the ggi_txd[31:0] unidirectional data bus. All packets transferred over the GGI Transmit bus are delimited by the TXSOF and TXEOF control words, which are indicated by the assertion of the ggi_txc signal. The tx_gmac_address[7:0] input from the Register Block is used to match the GMAC_Address[27:20] field of the TXSOF word. If there is no match, the packet should be ignored by the GGI TX State Machine.

The ggi_txp signal is the odd parity on the ggi_txd[31:0] and ggi_txc signals. Packets with parity errors on ggi_txp should be flagged but otherwise transmitted.

The Transmit FIFO implements a synchronous write port. The tx_fifo_write_enable signal, and the tx_fifo_write_data [31:0] as well as the tx_fifo_write_sop tx_fifo_write_eop which indicate the start and end of packets should be asserted to the rising edge of the clk input to the GGI TX State Machine. The number of valid bytes in the last word of the packet is indicated in bits [27:26] of the TXEOF word. (It is specifically noted that the TXSOF and TXEOF words should be written in to the Transmit FIFO and the tx_fifo_write_sop and tx_fifo_write_eop signals asserted respectively.)

The tx_fifo_three_words_before_full input signal from the Transmit FIFO Block from the Transmit FIFO enables the GGI Tx State Machine Block to throttle the GGI Transmit Bus, (by asserting the ggi_tx_full_1 signal) in time to avoid Transmit FIFO overflows; there is a two-clock latency of the GGI Transmit Bus to halt or start data transfers. The tx_sm[15:0] bus contains all the state machine bits (and perhaps some outputs) of the GGI TX State Machine to the Register Block for diagnostic read capability.

Transmit FIFO

The Transmit FIFO supports independent clocks for the read and write ports. The data width is 32 bits on both ports. Write_data is written into the FIFO when the write_enable signal is asserted before the rising edge of the write_clock signal, which is equivalent to the ggi_clk (52 MHz) signal of the GGI Tx State Machine. The write_eop and write_sop signals delimit the start and end of packets and contain the TXSOF and TXEOF words from the GGI Transmit Bus. Data is read out of the Transmit FIFO, by asserting the read_enable signal synchronous to the read_clock The read_clock is clocked at 62.5 MHz. This presents a challenge to the SERDES Tx State Machine Block, which is clocked at 125 MHz. (There is ambiguity with regards to whether the read_enable signal is asserted on the falling edge or the rising edge of the 62.5 MHz clock, which can be resolved by providing the 62.5 MHz clock as an input to the SERDES Transmit Block. There is also of course the phase difference between the 62.5 MHz clock and the 125 MHz Clock, which the DLL may or may not solve).

The read_sop and read_eop signals indicate the TXSOF and TXEOF words from the GGI Transmit bus. The read_data[31:0] of the Transmit FIFO is valid at the next rising edge of the read_clock and remains valid until the next read operation. After reset or a FIFO empty condition, a read operation must be performed before the first data word out of the Transmit FIFO is valid.

The Transmit FIFO provides the tx_fifo_empty and tx_fifo_full flags. The empty flag is generated synchronous to the read_clock and the full_flag is generated with respect to the write_clock. The three_words_before_full signal, (synchronous to the write_clock) allows the GGI Tx State Machine to throttle the GGI Transmit bus in time to avoid Transmit FIFO overflows to support the two clock latency in stalling the GGI Transmit bus.

The tx_fifo_read_ptr and tx_fifo_wrt_ptr signals are synchronous to the read_clock and write_clock respectively and are sent to the Register Block for diagnostic read capability. Unused most significant FIFO pointer bits should be zero-filled.

SERDES Tx State Machine

When the SERDES Tx State Machine is in the IDLE state, it must assert the serdes_tx_cmd_data_1 signal to the "high" level (to indicate "special K" character) and the serdes_tx_data[7:0] output to the "101 11100" state so that the Vitesse SERDES device will transmit the IDLE "special K" character, when no data is being transmitted.

When the Transmit FIFO is non-empty, i.e. tx_fifo_empty is false, the SERDES Tx State Machine reads 32 bit words, (tx_fifo_read_data[31:0]) out of the Transmit FIFO by asserting the tx_fifo_read_enable signal. The read port of the Transmit FIFO is clocked at 62.5 MHz and the SERDES Transmit State Machine is clocked at 125 MHz. Care should be exercised so that the tx_fifo_read_data[31:0] is correctly registered inside the SERDES Tx State Machine. (The DLL assures that the rising edge of the 62.5 MHz and the rising edge of the 125 MHz signal are aligned. However, the number of 125 MHz clock edges until data is valid is 2 or 3 clocks. A reasonable design approach is to always wait for 3 clocks before registering the tx_fifo_read_data[31:0]. The tx_fifo_read_sop and tx_fifo_read_eop signals from the Transmit FIFO are used to generate the "SOP" (K27.7) and "EOP" (K29.7) "special K" characters from the Vitesse SERDES, by asserting serdes_tx_cmd_data_1 signal to the "high" level (to indicate "special K" character) and the serdes_tx_data[7:0] output to the "111 11011 state and "111 11101" state respectively. The tx_fifo_read_eop input signal indicates the number of valid bytes in the previous word read out of the Transmit FIFO based on bits [27:26] of the word associated with the tx_fifo_read_eop. The SERDES Tx State Machine should read ahead data so that no extraneous characters sent to the Vitesse SERDES. Note that at least one IDLE character must be inserted between an EOP character and a SOP character for the next frame.

In addition to transmitting data from the Transmit FIFO to the Vitesse SERDES, the SERDES Tx State Machine is required to preemptively send "special K" characters, even in the midst of an ongoing packet transmission, depending on the occurrence of certain special events. The assertion of the send_tick input is the highest priority preemptive "special K" character transmission condition. The SERDES Tx State Machine shall control the Vitesse SERDES to transmit the "K23.7" "special K" character, as soon as it can do so. The next highest highest preemptive transmission condition occurs when the rx_fifo_status[4:0] indicates that the Receive FIFO is becoming full and a "K28.1" RBF character must be transmitted to the Transmitter at the other end of the point to point link. The RBA character shall be transmitted when the rx_fifo_status[4:0] signal indicates a less full Receive FIFO condition than that which caused the RBF character to be sent (hysteresis).

The next highest preemptive transmission condition occurs when the ping_rcvd signal is asserted, which requires the transmission of the "K28.6" "special K" (PONG) character in response. When a send_ping input is asserted, the "K28.2" character is transmitted.

When the rbf_rcvd signal is asserted indicating that the Receive FIFO at the receiving end of the SERDES Tx State Machine's transmission is becoming full, the SERDES Tx State machine shall immediately stop the transmission of data and instead start commanding the Vitesse SERDES device to send the "K28.5" IDLE character. The preemptive "special K" characters described above must continue to be transmitted. The SERDES Tx State Machine shall restart frame transmission when the rba_rcvd input signal is asserted indicating that the Receive FIFO at the receiving end of the SERDES Tx State Machine's transmission now has space available. If the rba_rcvd input is not asserted within the number of clocks at 125 MHz specified by the serdes_tx_time_out_interval[15:0] input from the Register Block after a "rbf_rcvd" assertion, the SERDES Tx State Machine shall abort the current packet transmission, assert the serdes_tx_time_out_interrupt, and increment the serdes_tx_time_out_cnt[7:0] signal.

The send_tick, ping_rcvd, rbf_rcvd, send_ping, and rba_rcvd signals are level inputs and are cleared when the send_tick_ack, ping_rcvd_ack, rbf_rcvd_ack, send_ping_ack and rba_rcvd_ack output signals are asserted.

SERDES Rx State Machine

The SERDES Rx State Machine receives 8-bits of data, serdes_rx_data[7:0], and four control signals, rsdet, err, kch, and idle, from the Vitesse SERDES device. Changes in the state of the rsdet input cause the assertion of the rsdet_state_change_interrupt. When rsdet is deasserted, the SERDES Rx State Machine is in the Idle state and no data is received. The err, kch and idle signals implement a truth table as described on page 15 of the Vitesse 7216 SERDES manual.

The "special K" characters are defined as follows (when Err/Kch/Idle=010 or 011)

| Code | RX_DATA | Meaning |
| --- | --- | --- |
| K28.0 | 000 11100 | SOC |
| K28.1 | 001 11100 | RBF |
| K28.2 | 010 11100 | PING |
| K28.3 | 011 11100 | RBA |

-continued

| Code | RX_DATA | Meaning |
| --- | --- | --- |
| K28.4 | 100 11100 | TFA |
| K28.5 | 101 11100 | IDLE |
| K28.6 | 110 11100 | PONG |
| K28.7 | 111 11100 | UNUSED |
| K23.7 | 111 10111 | TICK |
| K27.7 | 111 11011 | SOP |
| K29.7 | 111 11101 | EOP |
| K30.7 | 111 11110 | UNUSED |

The data and control signals are synchronous to a DLL driven 125 MHz clock. When the err, kch and idle signals indicate the reception of an IDLE character, the data is dropped.

If an error condition is indicated per the truth table on page 15 in the Vitesse 7216 SERDES manual, the serdes_rx_err output signal is asserted, along with the serdes_err_type[2:0] output, which copies the bit pattern for the error condition as presented in the truth table.

When a "special K" character is detected, the serdes_rx_data[7:0] input is inspected to determine the type of control character per the "special K" table above. If a SOC (start of control packet) is detected, all data characters are ignored until the next EOP for this revision of the LMAC (i.e. no high priority tunneling of control packets is supported). However, other "special K" characters still need to be correctly processed. If a RBF character is detected, the rbf_rcvd signal should be asserted until the rbf_rcvd_ack input is asserted for one clock, so that the SERDES Tx State Machine can stall transmission of data. If a PING, PONG, RBA, TICK is received, the ping_rcvd, pong_rcvd, rba_rcvd and tick_rcvd outputs are asserted respectively, until the corresponding ping_rcvd_ack, pong_rcvd_ack, rba_rcvd_ack and tick_rcvd_ack signals are asserted for one clock.

Note that special characters may come at any time and the state machine implementation should be cognizant of this fact.

The SERDES Rx State Machine shall implement a time-out feature if a RBA character is not received within a serdes_rx_time_out_interval[15:0] count of the 125 MHz clock after a RBF character reception. This situation implies that the sink of the data transmitted by the SERDES Tx State Machine has not emptied its Receive FIFO in a reasonable period and indicates an error condition (i.e. the expected XON character is taking longer than expected to arrive after a XOFF character was seen). The serdes_rx_time_out_interrupt output is asserted and the serdes_time_out_cnt[7:0] output is incremented.

If a SOP character is received from the Vitesse SERDES device, the SOP character and subsequent data characters are loaded into a 16-bit pipeline register. The SOP character is zero-padded to form the first 16-bit word. (This eases the alignment of the 16-bit words into 32-bit words at the output of the Receive FIFO for the GGI Rx State Machine).

When the 16-bit register is full, the register is loaded into the Receive FIFO, by placing the register output on to the rx_fifo_write_data[15:0] output bus. The rx_fifo_write_enable signal is asserted for two 125 MHz clock periods (the Receive FIFO's write port is clocked at 62.5 MHz) to write data into the Rx FIFO. The SOP and EOP characters are written into the Rx FIFO, with the rx_fifo_write_sop and rx_fifo_eop signals asserted in conjunction with the rx_fifo_write_enable signal. The eop_offset output is "low" when the EOP character is contained in the low byte, rx_fifo_ write_data[7:0], or "high" when the EOP character is contained in the high byte, rx_fifo_write_data[15:8].

The SERDES Rx State Machine also generates the serdes_rx_sm[15:0] outputs which contain the state machine bits and some outputs to the Register Block for diagnostic readback.

Receive FIFO

The Receive FIFO supports independent clocks for the read and write port. The datawidth is 16 bits on both ports. Write_data[15:0] is written into the FIFO when the write_enable signal is asserted before the rising edge of the write_clock signal, which is equivalent to the phyclk (62.5 MHz) signal of the SERDES Tx State Machine. The write_eop and write_sop input signals delimit the start and end of packets (the signals will never be asserted simultaneously) The eop_offset input indicates whether the EOP character is in write_data[15:8] or write_data[7:0].

Data is read out of the Receive FIFO, by asserting the read_enable signal synchronous to the read_clock. The read_clock is clocked at 104 MHz. This presents a challenge to the GGI Rx State Machine Block, which is clocked at 52 MHz. (The GGI Rx state machine must avoid driving the read_enable for multiple 104 MHz clock periods, and may imply that the GGI Rx State Machine may have a section that runs at 104 MHz. The alternative is that it may be ok to read two words since 32 bit words are required anyway. In this case the EOP flags maybe used to determine the last valid word TBD).

The read_sop and read_eop output signals indicate the SOP and EOP characters from the Vitesse SERDES device. The read_eop_offset output indicates whether the EOP character is in read_data[15:8] or read_data[7:0]. The read_data[15:0] output of the Receive FIFO is valid at the next rising edge of the read_clock and remains valid until the next read operation. After reset or a FIFO empty condition, a read operation must be performed before the first data word out of the Receive FIFO is valid.

The Receive FIFO provides the rx_fifo_empty and rx_fifo_full flags. The empty flag is generated synchronous to the read_clock and the full_flag is generated with respect to the write_clock. The Receive FIFO also provides the rx_fifo_status[4:0] signal which indicates the "fill state" of the Receive FIFO in 1/16 increments, i.e. 1/16 full, 2/16full, 3/16 full etc. The rx_fifo_status[4:0] output signal is used by the SERDES Tx State Machine block to transmit a RBF (receive buffer full) character when the Receive Buffer is becoming full and the source of the Receive FIFO's data stream needs to be shut off to avoid an overflow condition on the Receive FIFO. The rx_fifo_status[4:0] output signal is also used by the SERDES Tx State Machine block to generate the RBA signal when the Receive FIFO empties to a point where it may be filled again.

The rx_fifo_read_ptr[11:0] and rx_fifo_wrt_ptr[11:0] signals are synchronous to the read_clock and write_clock respectively and are sent to the Register Block for diagnostic read capability. The unused most significant bits should be zero-padded.

GGI Rx State Machine

The GGI Rx State Machine transfers data from the LMAC to the XPIF via the synchronous GGI Receive Bus. Data is read out of the Receive FIFO in 16-bit words and grouped as 32-bit entities before being transferred to the XPIF via the GGI Receive Bus Protocol.

The Receive FIFO implements a synchronous read port. The rx_fifo_read_enable signal is asserted synchronous to the Receive FIFO's read_clock input. The rx_fifo_read_data [15:0] output of the Receive FIFO as well as the rx_fifo_read_sop, rx_fifo_read_eop and the rx_fifo_read_eop_offset outputs are valid on the next rising edge of the 104 MHz read_clock. Successive rx_fifo_read_data[15:0] words are concatenated to form a 32-bit word for the GGI Receive Bus. When the rx_fifo_read_sop input to the GGI Rx State Machine is asserted, the start of a frame is being indicated and the RXSOF word (page 29 of the XPIF-300A2 manual) should be created and driven on the GGI Receive Bus.

The GGI Receive Bus Protocol has a minor variation depending on whether the XPIF is connected to one LMAC or two LMACs. The GGI Rx State Machine Block determines which of the two protocols is required by the dual_lmac_mode input from the Register Block. This level input indicates, when asserted, that the GGI Rx State Machine, should assert the ggi_rx_fav_l output when it has a frame to send to the XPIF. (Refer to FIG. 30 of the XPIF-300A2 document) and wait for the ggi_rx_go_l signal to be asserted before starting data transfers to the XPIF. When the dual_lmac_mode is deasserted, the GGI Rx State Machine should not assert the ggi_rx_fav_l signal and ignore the ggi_rx_go_l input.

The ggi_rxv_l output signal is asserted by the GGI Rx State Machine to indicate when there is valid data on the ggi_rxd[31:0] unidirectional databus. All packets transferred over the GGI Transmit bus are preceded by the TXSOF and TXEOF control words, which are indicated by the assertion of the ggi_txc signal, in conjunction with the ggi_rxv_l output. The UNIFO field of the RXSOF is equivalent to the ggi_rx_uinfo[7:0] input from the Register Block. The RXEOF word is created when the rx_fifo_read_eop input is asserted and the "ALN" field (bits[27:26]) is derived from the rx_fifo_read_eop_offset input from the Receive FIFO. The GGI Rx State Machine shall stall data transfers to the XPIF if the ggi_rx_full_l signal is asserted. There is a two-clock latency in stopping and starting transfers. The Receive FIFO may be in the empty condition several times during frame reception. The GGI Rx State Machine should not drive the ggi_rxv_l output when there is no valid data on the ggi_rxd[31:0] bus.

The ggi_rxp output is the odd parity generated on the ggi_rxd[31:0] and ggi_rxc outputs. The ggi_rx_sm[15:0] bus contains all the state machine bits (and perhaps some outputs) of the GGI Rx State Machine to the Register Block for diagnostic read capability.

Receive Tick Send Tick Block

The Receive Tick Send Tick Block provides the hardware facilities to determine the time interval between the reception of successive TICK (K23.7) characters is by the SERDES Rx State Machine, as indicated by the tick_rcvd signal. The jitter in the arrival times of the TICK characters can be attenuated by determining the time interval for multiple TICK characters to be received and taking the average. The rcv_tick_dec_count[9:0] input from the Register Block defines the "decimation frequency" or averaging interval for TICK characters received by the SERDES Rx State Machine. For example, when rcv_tick_dec_count[9:0]= 0000000001, the contents of a free-running 24-bit counter, running at 125 MHz are registered on the reception of every TICK character by the SERDES Rx State Machine. When the rcv_tick_dec_count[9:0] input=0000001111, the contents of a free-running 24-bit counter, running at 125 MHz are registered on the reception of every 15$^{th}$ TICK character received by the SERDES Rx State Machine and so on. The rcv_tick_interrupt signal is asserted for several clocks (exact number TBD), when the number of TICKs specified by the rcv_tick_dec_count[9:0] is received, and the registered value of the free-running 24-bit count is output on rcv_tick_interval[23:0]. The counter which counts the number of received TICK characters is then cleared and the process is repeated.

The Receive Tick Send Tick Block also provides the hardware facilities to determine the time interval between successive TICK (K23.7) characters transmitted by the SERDES Tx State Machine, as indicated by the send_tick signal. A TICK character is transmitted by the SERDES Tx State Machine, on the rising edge (more or less) of the send_tick input. The send_tick signal is nominally a 8 KHz square wave. The tx_tick_dec_count[9:0] input from the Register Block defines the "decimation frequency" or averaging time interval for TICK characters transmitted by the SERDES Tx State Machine. For example, when tx_tick_dec_count[9:0]=0000000001, the contents of a free-running 24-bit counter running at 125 MHz, (the same free-running counter as used in counting the TICK characters received by the SERDES Rx State Machine), are registered on the rising edge of the send_tick character by the SERDES Rx State Machine. When the tx_tick_dec_count[9:0] input=0000001111, the contents of a free-running 24-bit counter (the same free-running counter used to count the tick_rcvd signal), running at 125 MHz are registered on the transmission of every $15^{th}$ TICK character sent by the SERDES Rx State Machine, (i.e. $15^{th}$ assertion of the send_tick input) and so on. The send_tick_interrupt signal is asserted for several clocks (exact number TBD. The Receive Send Tick Block and the Register Block are in different clock domains), when the number of TICKs specified by the tx_tick_dec_count[9:0] is transmitted, and the registered value of the free-running 24-bit count is output on send_tick_interval[23:0] bus. The counter that counts the number of transmitted TICK characters (send_tick assertions) is then cleared and the process is repeated.

SERDES Receive Error Block

The SERDES Receive Error Block maintains error counters and statistics for the SERDES Receive Interface. When the serdes_rx_err input is asserted the error type is indicated by the serdes_rx_err_type[2:0]. A new error type may be indicated during every clock period (125 MHz).

A separate 16 bit counter is implemented to count the number of underrun/overrun errors, out of band errors and disparity errors. These counter values are output on the under_run_errcnt[15:0], out_of_band_errcnt[15:0] and disparity_errcnt[15:0] respectively.

When a loss of synchronization error is detected, the number of consecutive clock periods in which the loss of synchronization error persists is counted. (A reasonable way to implement this (16-bit) counter would be to reset the counter when the serdes_rx_err signal is not asserted or when the serdes_rx_err_type is different from the loss of synchronization and to increment the count when the serdes_rx_err input is asserted and the serdes_err_type indicates a loss of synchronization.) This counter's count value is output as the los_interval[15:0].

When an "in resync" error is detected, the number of consecutive clock periods in which an "in resync" error condition persists is counted. (A reasonable way to implement this (16-bit) counter would be to reset the counter when the serdes_rx_err signal is not asserted or when the serdes_rx_err_type is different from the "in resync" error state and to increment the count when the serdes_rx_err input is asserted and the serdes_err_type indicates an "in resync state"). This counter's count value is output as the loss_of_fsync_interval[15:0].

When the "in resync" error state is entered and exited, the loss_of_fsync_state_chng_int signal is asserted for an unspecified number of clocks.

Ping Timer Block

The Ping Timer Block periodically triggers the transmission of the PING character by the SERDES Tx State Machine. The send_tick input is an 8 KHz nominal square wave. The ping_interval[7:0] from the register block defines the frequency at which PING characters are sent from a minimum of 125 us between PINGs to a maximum of approximately 255*125 us=32 ms. The send_ping output is generated by counting the number of ping_interval[7:0] of send_tick inputs.

When the send_ping output is asserted a free running counter (125 MHz time base) is registered and output on ping_time[15:0]. When the pong_rcvd input is asserted, the same free-running counter is registered and output on pong_time[15:0].

LMAC Programmer's Manual

This register map applies to version 0.0 of the LMAC. All Registers are 16 bits wide, although not all bits of a register need be implemented. All Registers are cleared on power-up. On readback of a register bit field that is not defined, the value is "0". Data bits in parenthesis reflect the bit in ppc860 mode. In the case where two LMAC blocks are contained in the same FPGA, MPAD[0] selects between one bank of control registers and the other.

| Serdes_rx_err_type[2] | Serdes_rx_err_type[1] | Serdes_rx_err_type[0] | Error Type |
|---|---|---|---|
| 0 | 0 | 1 | underrrun/overrun |
| 1 | 0 | 0 | out of band error |
| 1 | 0 | 1 | disparity error |
| 1 | 1 | 0 | loss of synchronization |
| 1 | 1 | 1 | in resync state |

| Bit | Name | Definition |
|---|---|---|
| 1.0 LMAC Control Register R/W MPAD[0:10] = 0x0000 | | |
| D1 (d14) | Dual_LMAC mode | When reset, a single LMAC system is in use. When set a dual LMAC system is in use. |
| D0 (d15) | LMAC Internal Reset | When Set, the LMAC is reset. All state machines and registers in this LMAC, with the exception of this register are reset. |

-continued

| Bit | Name | Definition |
|---|---|---|
| 1.1 GMAC Address Register R/W MPAD[0:10] = 0x0001 | | |
| D15:D8 (d8:d15) | TX GMAC Address | Used in comparing against bits (27:20) of the TXSOF word by the GGI TX State Machine. It maybe a requirement to have bits D15:D8 of this register equal bits D7:D0 of this register. Transmit Frames from the XPIF that do not have a matching TX GMAC address field are filtered. |
| D7:D0 (d0:d7) | RX UINFO | Used to generate bits (27:20) of the RXSOF word and identifies the GMAC device in a multi-GMAC configuration. Used by the GGI RX State machine |

The RX_UNIFO and TX GMAC address field should be identical in normal operation.

| Bit | Name | Definition |
|---|---|---|
| 1.2 PING Timer Register R/W MPAD[0:10] = 0x0002 | | |
| D7:D0 (d0:d7) | Ping Interval Timer | The time interval between Pings that are transmitted is the value contained in the Ping Interval Timer. The lsb is equivalent to 125us. This parameter is used by the Ping Timer Block. |
| 1.3 Time of Last Ping Sent Register RO MPAD[0:10] = 0x0003 | | |
| D15:D0 (d0:d15) | Ping Time | The value of a free running 16-bit counter clocked at TBD Hz is latched when a Ping is transmitted by the SERDES Transmit State Machine Block. This status word is provided by the Ping Timer Block |
| 1.4 Pong Received Time Register RO MPAD[0:10] = 0x0004 | | |
| D15:D0 (d0:d15) | Pong Time | The value of a free running 16-bit counter clocked at TBD Hz is latched when a Pong is received by the SERDES Receive State Machine Block. This status word is provided by the Ping Timer Block. |
| 1.5 SERDES Loss of Signal Interval Register RO MPAD[0:10] = 0x0005 | | |
| D15:D0 (d0:d15) | LOS Interval | A 16-bit count of the time interval since the Loss of Signal Condition has been detected (RSDET signal from SERDES is false). Counter resolution in microseconds is TBD. This status word is provided by the SERDES Receive Error Log Block. |
| 1.6 SERDES Receive Loss of Synchronization Interval Register RO MPAD[0:10] = 0x0006 | | |
| D15:D0 (d0:d15) | Loss of Synchronization Interval | A 16-bit count of the time interval since the Loss of Synchronization has been detected. Counter resolution is TBD. This status word is provided by the SERDES Receive Error Log Block. |
| 1.7 SERDES Receive Underrun/Overrun Register RO MPAD[0:10] = 0x0007 | | |
| D15:D0 (d0:d15) | Underrun/Overrun Error Count | Number of Underrun/Overrun errors detected on the Receive SERDES This status word is provided by the SERDES Receive Error Log Block. |
| 1.8 SERDES Out of Band Error Register RO MPAD[0:10] = 0x0008 | | |
| D15:D0 (d0:d15) | Out of Band Error Detected Count | Number of Out of Band Errors detected on the Receive SERDES This status word is provided by the SERDES Receive Error Log Block. |
| 1.9 SERDES Disparity Error Register RO MPAD[0:10] = 0x0009 | | |
| D15:D0 (d0:d15) | Count of Number of Disparity Errors Detected | Number of Disparity errors detected on the Receive SERDES interface. This status word is provided by the SERDES Receive Error Log Block. |
| 1.10 Decimation Receive Tick Count Register R/W MPAD[0:10] = 0x000A | | |
| D9:D0 (d0:d9) | Receive Tick Decimation Count | Indicates the Number of Receive Ticks to count before generating the Receive Tick Interrupt used by the Ring Timing Synchronization Algorithm. (A free-running counter is also latched when the Decimation count is reached which provides a fine grain measure of the time interval between Decimation counts of Receive Ticks). This parameter is used by the Receive Tick/Send Tick Counter Block. |
| 1.11 Decimation Send Tick Count Register R/W MPAD[0:10] = 0x000B | | |
| D9:D0 (d0:d9) | Send Tick Decimation Count | Indicates the Number of Send Ticks to count before latching a free running counter which provides a fine-grain measure of the time interval between Decimation counts of Send Ticks. This parameter is used by the Receive Tick/Send Tick Counter Block. |
| 1.12 Send Tick Interval Register HI R/W MPAD[0:10] = 0x000C | | |
| D7:D0 (d0:d7) | Send Tick Interval Register HI. | Indicates the upper 8 bits of a 24-bit counter clocked at 62.5 MHz which was latched when the Send Tick Decimation Count of Send Ticks was transmitted. This parameter is provided by the Receive Tick/Send Tick Counter Block. |
| 1.13 Send Tick Interval Register LO R/W MPAD[0:10] = 0x000D | | |
| D15:D0 (d0:d15) | Send Tick Interval Register LO | Indicates the lower 16 bits of a 24-bit counter clocked at 62.5 MHz which was latched when the Send Tick Decimation Count of Send Ticks was transmitted. This parameter is provided by the Receive Tick/Send Tick Counter Block. |
| 1.14 Receive Tick Interval Register HI RO MPAD[0:10] = 0x000E | | |
| D7:D0 (d0:d7) | Receive Tick Interval Register HI. | Indicates the upper 8 bits of a 24-bit counter clocked at 62.5 MHz which was latched when the Receive Tick Decimation Count of Receive Ticks was received. This parameter is provided by the Receive Tick/Send Tick Counter Block. |
| 1.15 Receive Tick Interval Register LO RO MPAD[0:10] = 0x000F | | |
| D7:D0 (d0:d7) | Receive Tick Interval Register HI. | Indicates the upper 8 bits of a 24-bit counter clocked at 62.5 MHz which was latched when the Receive Tick Decimation Count of Receive Ticks was received. This parameter is provided by the Receive Tick/Send Tick Counter Block. |

-continued

| Bit | Name | Definition |
|---|---|---|
| 1.16 Receive SERDES State Machine TimeOut R/W MPAD[0:10] = 0x0010 | | |
| D15:D0 (d0:d15) | Receive State Machine Time Out Interval | Indicates a count interval at which a SERDES Receive State Machine which is expecting data (e.g. a RBF followed by a RBA sequence) does not get any data within the Timeout Interval. An interrupt is generated and the SERDES Receive Time Out Error Counter is incremented. This parameter is used by the Receive SERDES state machine block. |
| 1.17 Transmit SERDES State Machine TimeOut R/W MPAD[0:10] = 0x0011 | | |
| D15:D0 (d0:d15) | Receive State Machine Time Out Interval | Indicates a count interval at which a SERDES Transmit State Machine which is expecting to send data (e.g. a RBF followed by a missing RBA) does not get a RBA within the Time-out Interval. An interrupt is generated and the SERDES Transmit Time Out Error Counter is incremented. This parameter is used by the Transmit SERDES state machine block. |
| 1.18 Transmit SERDES SM Timeout Error Counter RO MPAD[0:10] = 0x0012 | | |
| D7:D0 (d0:d7) | SERDES Transmit State Machine Time Out Error Counter | Number of Time Out Errors in the Transmit SERDES State Machine This parameter is provided by the Transmit SERDES state machine block. |
| 1.19 Receive SERDES SM Timeout Error Counter RO MPAD[0:10] = 0x0013 | | |
| D7:D0 (d0:d7) | SERDES Receive State Machine Time Out Error Counter | Number of Time Out Errors in the Receive SERDES State Machine This parameter is provided by the Receive SERDES State machine block. |
| 1.20 PHY Control Register R/W MPAD[0:10] = 0x0014 | | |
| D3 (d12) | PTXEN | Transmit Enable for SERDES |
| D2 (d13) | LOOP_EN | Loopback Enable for SERDES |
| D1 (d14) | BIST | Built-In Self Test Input to SERDES |
| D0 (d15) | PHY_RST | RESET input to SERDES |
| 1.21 PHY Status Register RO MPAD[0:10] = 0x0015 | | |
| D1 (d14) | PBERR | PBERR from SERDES |
| D0 (d15) | RSDET | RSDET from SERDES |
| 1.22 Receive FIFO Data Register HI RO MPAD[0:10] = 0x0016 | | |
| D15:D0 (d0:d15) | FIFO Data | FIFO Data at output of Receive FIFO. D[15:0] |
| 1.23 Receive FIFO Write Pointer Register RO MPAD[0:10] = 0x0017 | | |
| D12 (d3) | Fifo_Full | Receive FIFO Full |
| D11:D0 (d4:d15) | Fifo Write Pointer | Receive FIFO Write Pointer |
| 1.24 Receive FIFO Read Pointer Register RO MPAD[0:10] = 0x0018 | | |
| D12 (d3) | Fifo_Empty | Receive FIFO Empty |
| D11:D0 (d4:d15) | Fifo Read Pointer | Receive FIFO Read Pointer |
| 1.25 TX FIFO Data Register HI RO MPAD[0:10] = 0x0019 | | |
| D15:D0 (d0:d15) | Tx FIFO Data HI | FIFO Data at output of Transmit FIFO. D[31:16] |
| 1.26 TX FIFO Data Register LO RO MPAD[0:10] = 0x001A | | |
| D15:D0 (d0:d15) | Tx FIFO Data LO | FIFO Data at output of Transmit FIFO. D[15:0] |
| 1.27 TX FIFO Write Pointer Register RO MPAD[0:10] = 0x001B | | |
| D12 (d3) | Fifo_Full | Transmit FIFO Full |
| D11:D0 (d4:d15) | Fifo Write Pointer | Transmit FIFO Write Pointer |
| 1.28 Transmit FIFO Read Pointer Register RO MPAD[0:10] = 0x001C | | |
| D12 (d3) | Fifo_Empty | Transmit FIFO empty |
| D11:D0 (d4:d15) | Fifo Read Pointer | Transmit FIFO Read Pointer |
| 1.29 SERDES Transmit State Machine R/O MPAD[0:10] = 0x001D | | |
| D15:D0 (d0:d15) | State Register | SERDES Transmit State Machine State Bits Provided by SERDES Transmit State Machine. |
| 1.30 SERDES Receive State Machine R/O MPAD[0:10] = 0x001E | | |
| D15:D0 (d0:d15) | State Register | SERDES Receive State Machine State Bits Provided by SERDES Receive State Machine. |
| 1.31 GGI Transmit State Machine R/O MPAD[0:10] = 0x001F | | |
| D15:D0 (d0:d15) | State Register | GGI Transmit State Machine State Bits Provided by GGI Transmit State Machine |
| 1.32 GGI Receive State Machine R/O MPAD[0:10] = 0x0020 | | |
| D15:D0 (d0:d15) | State Register | GGI Receive State Machine State Bits Provided by GGI Receive State Machine |
| 1.33 Interrupt Register RO MPAD[0:10] = 0x0021 | | |
| D5 (d10) | Pong Received | from SERDES Rx State Machine |
| D4 (d11) | Loss of Synchronization State Change | from SERDES Rx State Machine |
| D3(d12) | RSDET State Change | from SERDES Rx State Machine |
| D2(d13) | Receive Tick Interrupt | from Send Tick/Receive Tick Block |
| D1(d14) | SERDES TX Timeout | from SERDES Tx State Machine |
| D0(d15) | SERDES RX Timeout | from SERDES Rx State Machine |

Reading this register clears the register.

| 1.34 Interrupt Mask Register RO MPAD[0:10] = 0x0022 | | |
|---|---|---|
| Bit | Name | Definition |
| D5 (d10) | Pong Received Enable | Enables Corresponding Interrupt in Register 0x21 |
| D4 (d11) | Loss of Synchronization State Change Enable | |
| D3 (d12) | RSDET State Change Enable | |
| D2 (d13) | Receive Tick Interrupt Enable | |
| D1 | SERDES TX Timeout | |

| 1.34 Interrupt Mask Register RO MPAD[0:10] = 0x0022 | | |
| --- | --- | --- |
| Bit | Name | Definition |
| (d14) | Enable | |
| D0 | SERDES RX Timeout | |
| (d15) | Enable | |

The above description of the hardware used to implement one embodiment of the invention is sufficient for one of ordinary skill in the art to fabricate the invention since the general hardware for packet switching and routing is very well known. One skilled in the art could easily program the MACs, packet processors, CPU 46, and other functional units to carry out the steps describe herein. Firmware or software may be used to implement the steps described herein.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed in a communications network, said communications network comprising nodes, at least one of said nodes transmitting a data frame on said network, said method comprising:
    generating a control signal by a first one of said nodes;
    inserting and transmitting said control signal on said network to at least a second one of said nodes during a transmission of said data frame on said network, wherein said control signal is prioritized to be inserted before any other queued data or control codes;
    receiving, by said second one of said nodes, said control signal after receiving only a portion of said data frame, wherein said control signal was inserted in said data frame outside of a payload field of said data frame; and
    performing, by said second one of said nodes, an action required by said control signal prior to waiting until data frame has been fully received.

2. The method of claim 1 wherein said transmitting said control signal comprises transmitting a master clock signal, said method further comprising:
    generating local clock signals by a local clock in said second one of said nodes, wherein said performing an action comprises:
    correcting any timing error in said local clock based on the time that said master clock signal was received by said second node after receiving only a portion of said data frame so that timing jitter is limited to less than a data frame period.

3. The method of claim 2 wherein said master clock signal is an 8 KHz clock.

4. The method of claim 3 wherein said 8 KHz clock is a Global Positioning System (GPS) clock.

5. The method of claim 1 wherein said data frame is transmitted in accordance with an Ethernet protocol.

6. The method of claim 1 wherein said control signal is an 8B/10B encoded control character.

7. The method of claim 1 wherein said data frame is a packet.

8. The method of claim 1 wherein said control signal is a master clock signal.

9. The method of claim 1 wherein said performing an action comprises performing in action by media access controller (MAC).

10. The method of claim 1 wherein said control signal is a master clock signal, and wherein said performing an action comprises taking steps to correct a timing error between a local clock in said second one of said nodes and said master clock signal.

11. The method of claim 1 wherein said performing an action comprise synchronizing a local clock in said second one of said nodes with said control signal.

12. A method performed in a communications network, said communications network comprising nodes, at least one of said nodes transmitting a data frame on said network, a first one of said nodes generating a control signal and transmitting said control signal on said network to at least a second one of said nodes during a transmission of said data frame on said network, said method comprising:
    receiving, by said second one of said nodes, said control signal after receiving only a portion of said data frame; and
    performing, by said second one of said nodes, an action required by said control signal prior to waiting until said data frame has been fully received,
    wherein said control signal is a master clock signal, and wherein said performing an action comprises taking steps to correct a timing error between a local clock in said second one of said nodes and said master clock signal, wherein said control signal is an 8B/10B encoded character, and wherein said timing error is corrected so that a clock jitter in said second one of said nodes is approximately the period of said 8B/10B encoded character.

13. A method performed in a communications network, said communications network comprising nodes, at least one of said nodes transmitting a data frame on said network, said method comprising:
    generating a control signal by a first one of said nodes;
    inserting and transmitting said control signal on said network to at least a second one of said nodes during a transmission of said data frame on said network, wherein said control signal is prioritized to be inserted before any other queued data or control codes;
    receiving, by said second one of said nodes, said control signal after receiving only a portion of said data frame; and
    performing, by said second one of said nodes, an action required by said control signal prior to waiting until said data frame has been fully received,
    wherein said control signal is a master clock signal, and wherein said performing an action comprises taking steps to correct a timing error between a local clock in said second one of said nodes and said master clock signal,
    wherein said control signal is a MAC layer encoded character, and wherein said timing error is corrected so that a clock jitter in said second one of said nodes is approximately the period of said MAC layer encoded character.

* * * * *